(12) United States Patent
Hargreaves et al.

(10) Patent No.: US 9,268,047 B2
(45) Date of Patent: Feb. 23, 2016

(54) GEOPHYSICAL SURVEYING

(71) Applicant: ROCK SOLID IMAGES INC, Houston, TX (US)

(72) Inventors: Neil Hargreaves, London (GB); Sven Treitel, Tulsa, OK (US)

(73) Assignee: Rock Solid Images, Inc, Houston, TX (US)

( * ) Notice: Subject to any disclaimer, the term of this patent is extended or adjusted under 35 U.S.C. 154(b) by 569 days.

(21) Appl. No.: 13/650,920

(22) Filed: Oct. 12, 2012

(65) Prior Publication Data

US 2014/0102694 A1 Apr. 17, 2014

(51) Int. Cl.
*G01V 1/28* (2006.01)
*G01V 1/00* (2006.01)
*E21B 49/00* (2006.01)

(52) U.S. Cl.
CPC .............. *G01V 1/003* (2013.01); *E21B 49/00* (2013.01); *G01V 1/282* (2013.01); *G01V 1/28* (2013.01)

(58) Field of Classification Search
CPC ................................. G01V 1/28; G01V 1/282
USPC ........................................ 367/38, 73; 702/14
See application file for complete search history.

(56) References Cited

U.S. PATENT DOCUMENTS

| | | | | |
|---|---|---|---|---|
| 4,679,174 | A * | 7/1987 | Gelfand | 367/73 |
| 5,848,379 | A * | 12/1998 | Bishop | 702/6 |
| 6,985,815 | B2 | 1/2006 | Castagna et al. | |
| 2002/0128778 | A1* | 9/2002 | Pepper et al. | 702/14 |
| 2014/0039799 | A1* | 2/2014 | Krohn | 702/14 |

OTHER PUBLICATIONS

Aarts, R. M., et al.; A unified approach to low- and high-frequency bandwidth extension; AES 115th Convention, Oct. 10-13, 2003; Convention Paper 5921; pp. 1-16; New York.
Broadhead, M. K. and Tonellot, T. L.; (P395) Sparse seismic deconvolution by method of orthogonal matching pursuit; 72nd EAGE Conference & Exhibition incorporating SPE EUROPEC 2010; Jun. 14-17, 2010; 5 pages; Barcelona.
Castagna, J. P. and Sun, S., Comparison of spectral decomposition methods; first break; Mar. 2006; issue 3, vol. 24; pp. 75-79; EAGE Publications.

(Continued)

*Primary Examiner* — Ian J Lobo
(74) *Attorney, Agent, or Firm* — Locke Lord LLP

(57) ABSTRACT

A computer-implemented method for processing a seismic trace of a subterranean region comprising: (a) deriving a seismic wavelet for a time-window of seismic trace; (b) generating a model for the subterranean region corresponding to that time-window comprising a plurality of seismic reflectors by comparing the seismic wavelet with the time-window of the seismic trace to identify locations for the seismic reflectors, wherein the locations of the seismic reflectors are subject to a separation constraint requiring neighboring seismic reflectors to be separated by at least a minimum separation threshold which is greater than a separation corresponding to a sampling interval for the seismic trace; (c) defining a model seismic wavelet having a model seismic wavelet amplitude spectrum with a frequency bandwidth which is greater than that of the seismic wavelet amplitude spectrum determined for the time-window of the seismic trace; and (d) generating a model of the time-window of the seismic trace for the subterranean region based on the plurality of seismic reflectors of the model for the subterranean region corresponding to that time window and the model seismic wavelet.

2 Claims, 13 Drawing Sheets

(56) References Cited

OTHER PUBLICATIONS

Castagna, J. P. and Sun, S., Instantaneous spectral analysis: Detection of low-frequency shadows associated with hydrocarbons; The Leading Edge; Feb. 2003; pp. 120-127.

Chakraborty, A. and Okaya, D.; Frequency-time decomposition of seismic data using wavelet-based methods; Geophysics; vol. 60, No. 6; Nov.-Dec. 1995; pp. 1906-1916.

Chen, S. S. et al.; Atomic decomposition by basis pursuit; SIAM Journal on Scientific Computing; 1996; pp. 1-29.

Chopra, S., et al; Seismic resolution and thin-bed reflectivity inversion; CSEG Recorder; Jan. 2006; pp. 19-25.

Daubechies, I., et al; Iteratively reweighted least squares minimization for sparse recovery; Communications on Pure and Applied Mathematics, vol. LXIII, pp. 0001-0038 (2010); Wiley Periodicals, Inc.

Devi, K. R. S. and Schwab, H.; High-resolution seismic signals from band-limited data using scaling laws of wavelet transforms; Geophysics; vol. 74, No. 2; Mar.-Apr. 2009; pp. WA143-WA152 (101190/1.377622).

Dietz, M., et al.; Spectral band replication, a novel approach in audio coding; AES 112th Convention; May 10-13, 2002; Convention Paper 5553; pp. 2-8; Munich.

Herrmann, F. J.; Seismic deconvolution by atomic decomposition: a parametric approach with sparseness constraints; Aug. 6, 2004; pp. 1-44; Univ. of British Columbia Dept. of Earth, Ocean and Atmospheric Sciences, Vancouver.

Hsu, Han-Wen, et al.; Fast complex quadrature mirror filterbanks for MPEG-4 HE-AAC; AES 121th Convention; Oct. 5-8, 2006; Convention Paper, pp. 1-13, San Francisco.

Kallweit R. S. and Wood L. C.; The limits of resolution of zero-phase wavelets; Geophysics, vol. 47, No. 7; Jul. 1982; pp. 1035-1046.

Larsen, E., and Aarts, R. M., Audio Bandwith Extension, Application of Psychoacoustics, Signal Processing and Loudspeaker Design; 0-470-85864-8 Hbk 312 pp.; ISBN 13:978-0-4708-5864-6; Sep. 2004.

Mallat, S. G. and Zhang, Z.; Matching pursuits with time-frequency dictionaries; IEEE Transactions on Signal Processing; vol. 41, No. 12; Dec. 1993; pp. 3397-3415.

Oldenburg, D. W., et al.; Recovery of the acoustic impedance from reflection seismograms; Geophysics; vol. 48, No. 10; Oct. 1983; pp. 1318-1337.

Pati, Y. C., et al.; Orthogonal matching pursuit: Recursive function approximation with applications to wavelet decomposition; IEEE 1058-6393/93; 1993; pp. 40-44.

Pendrel, J. and Van Riel, P., Effect of well control on constrained sparse spike seismic inversion; CSEG Recorder; Dec. 2000; pp. 18-26; and CSEG Recorder; Correction issued Jan. 2001; p. 50.

Portniaguine, O. and Castagna, J.; Inverse spectral decomposition; SEG Int'l. Exposition and 74th Annual Meeting; Oct. 10-15, 2004; 4 pgs.; Denver.

Portniaguine, O. and Castagna, J.; Spectral inversion: Lessons from Modeling and Boonesville Case Study; SEG Paper 2005; 4 pp.

Puryear, C. I. and Castagna, J. P.; Layer-thickness determination and stratigraphic interpretation using spectral inversion: Theory and application; Geophysics; vol. 75, No. 2; Mar.-Apr. 2008; pp. R37-R48 (10.1190/1.2838274).

Smith, M.; et al.; Extending seismic bandwidth using the continuous wavelet transform; first break; vol. 26; Jun. 2008; pp. 92-102; EAGE Publications.

Van Riel, P. and Berkhout, A. J.; Resolution in seismic trace inversion by parameter estimation; Geophysics; vol. 50, No. 9; Sep. 1985; pp. 1440-1455.

Wang, Y.; Seismic time-frequency spectral decomposition by matching pursuit; Geophysics; vol. 72, No. 1; Jan.-Feb. 2007; pp. V13-V20 (10.1190/1.2387109).

Wang, Y.; Multichannel matching pursuit for seismic trace decomposition; Geophysics; vol. 75, No. 4; Jul.-Aug. 2010; pp. V61-V66 (10.1190/1.3462015).

Zhang, R. and Castagna J; Seismic spare-layer reflectivity inversion using basis pursuit decomposition; Geophysics; vol. 76, No. 6; Nov.-Dec. 2011; pp. R147-R158 (910.1190/GEO2011-0103.1).

Levy, S. and Fullagar, P. K.; Reconstruction of a sparse spike train from a portion of its spectrum and application to high-resolution deconvolution; Geophysics, vol. 46, No. 9; Sep. 1981, pp. 1235-1243.

\* cited by examiner

```
zero the reflectivity
set the data residual equal to the input data trace
for each of niter iterations:
    correlate the wavelet with the data residual
    find the value and location of the maximum correlation
    set the amplitude and position of the next reflection
    from these values
    build an intermediate model of the seismic trace by
    convolving the wavelet with the current set of reflections
    update the current set of reflection amplitudes by least
    squares fitting this intermediate model to the original data
    generate an updated model of the trace by convolving the
    wavelet with the updated reflectivity
    subtract the updated model from the original data to get
    the updated data residual
    if the RMS of the residual is less than a specified
    threshold - end
    if not, continue
end iterations
```

FIG. 8

GEOPHYSICAL SURVEYING

BACKGROUND OF THE INVENTION

The invention relates to geophysical surveying, and in particular to seismic surveying, and more particularly still to methods and apparatus for processing a seismic trace from a subterranean region.

Seismic techniques are frequently used for geophysical surveying with a view to characterizing structures in the subterranean strata. For example, such techniques are sometimes used to seek to identify the existence, location and extent of potential hydrocarbon-bearing reservoirs in subterranean rock strata.

In simple terms a seismic survey involves directing sound waves into the Earth, e.g. using an air gun array, and recording the sound energy that is reflected back to the Earth's surface as a function of time using a geophone (or hydrophone). The timings and strengths of features in the recorded sound energy can be used to calculate the locations and characteristics of subterranean structures/interfaces giving rise to sound reflection within the Earth. Accordingly, one fundamental output from a seismic survey is a so-called seismic trace which provides a representation of recorded sound energy as a function of time following an air gun induced event. There are many well understood techniques for obtaining seismic traces and these are not described here in the interest of brevity.

As is well known, an aspect of seismic surveying which impacts the ability to resolve subterranean structure is the frequency content of the recorded seismic data. The frequency content of seismic data is a function of many things, for example, the frequency content of the originating trigger event (e.g. air gun array), the frequency-dependent attenuation within the Earth (so-called Q-filtering), the frequency response of the recording system, and the frequency characteristics of any pre-processing of the data, such as various noise-reducing filtering methods. It is generally the case that seismic data having a frequency content associated with a relatively high frequency bandwidth will allow for improved stratigraphic and lithographic interpretation as compared to seismic data with relatively low frequency content.

A simple but widely used description of a seismic trace is that it consists of a reflection series convolved with a seismic wavelet plus data noise (i.e. $d=w*r+n$, where "d" is the seismic trace, "w" is the seismic wavelet, "r" is a reflection series that represents the reflection from different layers in the subterranean region, "n" is noise and "*" is the convolution operator symbol). Given this description of the trace, various studies (e.g. Kallweit and Wood, 1982 [1]) have related the degree to which nearby reflection events in seismic data can be resolved to the time-duration of the wavelet and its equivalent wavelet frequency content. Such studies show that the resolving power can increase if the wavelet bandwidth and/or its upper cut-off frequency (according to different studies) increases, if the wavelet spectrum is flat from lower to upper cut-off frequencies and if the wavelet is zero phase.

Standard seismic data processing such as deconvolution, spectral whitening or inverse Q-filtering can be applied to recorded data with the objective of increasing the data resolving power. A starting point for these or equivalent techniques is modeling or estimation of the wavelet amplitude and (possibly) the wavelet phase spectrum. In the case of spectral whitening this is via explicit estimation of the amplitude spectrum; in deconvolution the amplitude is implicit in the autocorrelation input and phase is estimated via the minimum phase assumption; in inverse Q-filtering an assumed physical model is used to describe the earth filtering. A general assumption often made in statistical processes is that the amplitude spectrum of the seismic reflectivity is equal at all frequencies—i.e. the reflectivity is assumed to have a "white", or flat, amplitude spectrum—so that data derived estimates of the amplitude spectrum are equal to the amplitude spectrum of the seismic wavelet.

In each case a subsequent step in the process is the design of an inverse operator that aims to flatten the wavelet amplitude spectrum, in addition to possibly treating the wavelet phase spectrum. The general term used to describe this step is "wavelet inverse processing". After such processing, the degree to which nearby events can be resolved is then characterized by the time duration of the processed version of the wavelet and its frequency content, for example according to the criteria given by Kallweit and Wood, 1982 [1].

If there were zero data noise, it would in principle be possible to flatten the wavelet amplitude spectrum over any desired frequency range and hence fully resolve the seismic reflectivity. In the presence of the inevitable data noise, however, the frequency range over which it is possible to flatten the wavelet amplitude spectrum is restricted by the noise. This is because at frequencies where the wavelet amplitude is near to the noise level applying relatively high amplification to seek to flatten the wavelet amplitude spectrum will result in the noise also being amplified.

The level and type of noise present in recorded seismic data may vary considerably from dataset to dataset, depending primarily on acquisition conditions; land seismic data generally contains a wider variety and greater levels of noise than marine seismic data. An approximate rule of thumb is that the dynamic range of unprocessed seismic data, defined as the range from the peak of the data amplitude spectrum to the average noise amplitude, is of the order of 40 dB for adequate quality marine seismic data, and is less, typically 30 dB or below, for land seismic data.

The low frequency spectrum of the wavelet is primarily a function of the acquisition parameters—the low frequency response of the seismic source, detector and recording instruments, plus, in marine seismic, the "ghost" effect related to the depth of the marine seismic source and streamer. Taken together these effects constitute a low cut filter with a cut-off point that is typically in the region of 5 to 15 Hz and a low frequency roll-off of 20 to 30 dB/octave.

The high frequency spectrum, on the other hand, is primarily determined by the loss of high frequency energy caused by scattering or absorption on propagation, collectively referred to as the "earth Q-filter". Typical recorded data, before processing, exhibits a linear logarithmic decay of amplitude versus frequency at a particular travel time, with the slope of the decay characterized by the seismic quality factor Q. Average Q values for two-way propagation from the surface to reflector are usually between 100 to 200, varying primarily with the geographical location of the survey.

In typical quality marine data with a dynamic range of 40 dB and a Q value of 150, the signal amplitude at high frequencies reaches the noise level at approximately 110 Hz for a reflection time of 1 s, and at approximately 37 Hz for a reflection time of 3 s. The high frequency cut-off occurs at a lower frequency at higher time delays in the seismic trace because these times correspond to signals that have propagated further in the Earth, and hence are relatively more significantly attenuated at the higher frequencies. In poorer quality data or for lower Q values these frequency cut-off values may be significantly reduced with an associated reduction in interpretation resolution.

The level of the data noise and the low and high frequency spectra of the wavelet are the primary factors that determine the useable range of frequencies over which wavelet inverse processing is able to flatten the wavelet amplitude spectrum. Since these properties of the recorded data may vary in an unknown manner from survey to survey, and also from trace to trace throughout a survey area, typically processing tests must be used to establish the degree of spectral flattening that is possible before the noise amplification becomes unacceptable.

It is the noise content of the data in particular that is the limiting constraint on the improvement in resolution which is achievable by wavelet inverse processing. Resolution can be further enhanced when using this approach only by processes such as common mid-point (CMP) stacking that seek to improve the relative signal to noise level of the data using well known statistical summing techniques.

There has, however, been a significant amount of research into alternative methods for extending the usable frequency range of data over the last decade or so in areas such as speech and music reproduction, telephony, loudspeaker design and audio data compression. General references for this are, for example, Aarts et al (2003) [12] and Larsen and Aarts (2004) [13]. The techniques that have been developed in those fields do however often rely on specific statistical and/or physical properties of the input and as such do not necessarily have direct applicability to seismic data; speech and music have a harmonic structure, for example, which has been exploited for bandwidth extension on both the low and high end of the input spectrum.

Mpeg decompression exploits this harmonic structure to recreate higher frequencies from low frequencies by a wavelet transform ("filterbank") method (Dietz et al, 2002 [14], Hsu et al 2006 [15]). Mpeg decompression, unlike the equivalent seismic problem, is not a "blind" technique, since information extracted during the compression phase can be used during decompression. Related wavelet transform methods have, however, been proposed for seismic bandwidth extension. Smith et al (2008) [16] seek to exploit a purported harmonic structure in seismic data caused by thin-bed interference by a wavelet transform-based generation of high frequencies; Devi and Schwab (2009) [17] similarly exploit the scaling behavior of the wavelet transform to derive higher frequency information from band-limited data. A related approach is described by Puryear and Castagna (2008) [18], who present an algorithm for calculation of bed thickness and reflection coefficients from amplitude spectra, and use this to invert wavelet transform data for layer thickness.

A different approach has been described by Portniaguine and Castagna et al (2005) [24] and Chopra et al (2006) [25] which the authors call "spectral inversion" or "thin-bed reflectivity inversion". Although not directly addressing the issue of bandwidth extension of the seismic trace as such, this derives what are termed high resolution estimates of seismic reflectivity. The authors describe their approach as "a form of sparse-spike inversion in that it outputs a sparse reflectivity series", or "a post-stack spectral inversion method". The approach appears to be a type of matching pursuits decomposition ("exponential pursuit decomposition") in which the basis functions for the decomposition are a set of positive and negative thin-layer dipoles, convolved with the seismic wavelet.

Their method is derived from earlier work by Castagna et al (2003) [19] and Portniaguine and Castagna (2004) [20], as originally proposed by Chakraborty and Okaya (1995) [21], wherein a form of high resolution spectral decomposition ("instantaneous spectral analysis") is performed using a variant of a matching pursuits algorithm; this is described in U.S. Pat. No. 6,985,815 [22] and also dealt with in Castagna and Sun (2006) [23]. Several other authors have also suggested matching pursuits and related algorithms for the derivation of high resolution seismic reflectivity estimates. These include Herrmann (2003) [26], Wang (2007) [27], Broadhead and Tonellot (2010) [28] and Zhang and Castagna (2011) [29].

Although these techniques aim to derive a high resolution version of a reflectivity series they do not directly address the question of increasing the frequency content of the data itself. There therefore remains a need for new techniques for processing seismic survey data with a view to increasing the frequency content/bandwidth of the data in order to enhance the resolution of events on the seismic trace.

SUMMARY OF THE INVENTION

According to a first aspect of the invention there is provided a computer-implemented method for processing a seismic trace of a subterranean region, the method comprising: (a) deriving a seismic wavelet for a time-window of the seismic trace; (b) generating a model for the subterranean region corresponding to that time window comprising a plurality of seismic reflectors by comparing the seismic wavelet with the time-window of the seismic trace to identify locations for the seismic reflectors, wherein the locations of the seismic reflectors are subject to a separation constraint requiring at least some neighboring seismic reflectors to be separated by at least a minimum separation threshold which is greater than a separation corresponding to a sampling interval for the seismic trace; (c) defining a model seismic wavelet having a model seismic wavelet amplitude spectrum with a frequency bandwidth which is greater than that of the seismic wavelet amplitude spectrum determined for the time-window of the seismic trace; (d) generating a model of the time-window of the seismic trace for the subterranean region based on the plurality of seismic reflectors of the model for the subterranean region corresponding to that time window and the model seismic wavelet.

The inventors have found techniques in accordance with some embodiments of the invention can be effective for processing seismic survey data to increase the effective frequency content/bandwidth of the data in order to enhance the resolution of events on the seismic trace. Such processes can have benefits for both seismic processing and interpretation. If applied at an early stage in a processing sequence they can allow for more accurate estimation of the parameters used in subsequent processes, since processing parameters are often derived from analysis and interpretation of the data itself. By improving the resolution of the data it can be possible to build higher resolution models of structure and stratigraphy than would otherwise be possible. Resolution-enhanced data obtained in accordance with embodiments of the invention could be input into a pre- or post-stack seismic inversion process to recover acoustic and/or elastic impedance, density, or other seismic attributes; these could then be used to help determine, at higher resolution than possible using the original data, the lithology and/or fluid properties of subterranean strata.

According to some embodiments the method further comprises outputting a representation of the model of the time-window of the seismic trace.

According to some embodiments outputting a representation of the model of the time-window of the seismic trace comprises displaying a representation of the model of the time-window of the seismic trace on a display.

According to some embodiments the method further comprises generating a model of the seismic trace by repeating steps (a) to (d) for multiple time-windows of the seismic trace and combining the models associated with the respective time-windows to generate the model of the seismic trace.

According to some embodiments the method further comprises outputting a representation of the model seismic trace.

According to some embodiments outputting a representation of the modeled seismic trace comprises displaying a representation of the modeled seismic trace on a display.

According to some embodiments step (b) is performed by iteratively comparing the seismic wavelet with the time-window of the seismic trace to determine a location and strength for an individual seismic reflector, subtracting from the time-window of the seismic trace a contribution associated with the individual reflector based on its determined location and strength and the seismic wavelet to provide a residual time-window of the seismic trace to be used in a subsequent iteration to determine the location and strength of another seismic reflector.

According to some embodiments step (b) is performed using an orthogonal matching pursuit algorithm.

According to some embodiments the number of reflectors comprising the model of the subterranean region is constrained by an upper limit which is a non-unity fraction of the number of samples comprising the time-window of the seismic trace.

According to some embodiments the upper limit is a fraction selected from the group comprising: 0.50, 0.45, 0.40, 0.35, 0.30, 0.25, 0.20, 0.15, 0.10, 0.09, 0.08, 0.07, 0.06, 0.05, 0.04, 0.03, 0.02 and 0.01

According to some embodiments step (b) comprises re-sampling the time-window of the seismic trace to a re-sampling interval corresponding to the minimum separation threshold in order to apply the separation constraint.

According to some embodiments the re-sampling interval and the frequency content for the model seismic wavelet are related to one another.

According to some embodiments the re-sampling interval is related to an upper frequency associated with the frequency content of the model seismic wavelet.

According to some embodiments an amplitude spectrum of the seismic wavelet generated in step (a) is obtained from an amplitude spectrum of the window of the seismic trace.

According to some embodiments a phase spectrum of the seismic wavelet generated in step (a) is constant across a frequency bandwidth of the seismic wavelet.

According to some embodiments step (b) is repeated a plurality of times with different seismic wavelet phase spectra for the seismic wavelet to generate a corresponding plurality of models for the subterranean region, and wherein a phase spectrum for the model seismic wavelet used in step (c) is based on at least one of the different seismic wavelet phase spectra used to generate the plurality of models for the subterranean region in dependence on how closely the time-window of the seismic trace can be forward-modeled from different ones of the plurality of models of the subterranean region.

According to some embodiments steps (c) and (d) are repeated a plurality of times for different model seismic wavelet amplitude spectra having different frequency bandwidths to provide a corresponding plurality of models of the time-window of the seismic trace for the subterranean region with different frequency content characteristics.

According to some embodiments the model seismic wavelet amplitude spectrum is approximately uniform across the frequency bandwidth of the model seismic wavelet.

According to some embodiments the model seismic wavelet has a phase spectrum that is constant across the frequency bandwidth of the model seismic wavelet.

According to some embodiments the model seismic wavelet amplitude spectrum corresponds to the profile of a Butterworth-type filter response extending between a lower frequency and an upper frequency defining the frequency bandwidth of the model seismic wavelet.

According to another aspect of the invention there is provided a method for obtaining hydrocarbon from an area that contains a hydrocarbon-bearing subterranean reservoir, the method comprising: processing a seismic trace obtained for the area according to the first aspect; identifying the presence of the hydrocarbon-bearing subterranean reservoir from the processed seismic trace; penetrating the identified hydrocarbon-bearing subterranean reservoir with a hydrocarbon-producing well.

According to another aspect of the invention there is provided a volume of hydrocarbon obtained from an area that contains a hydrocarbon-bearing subterranean reservoir, the hydrocarbon obtained by: processing a seismic trace obtained for the area according to the first aspect; identifying the presence of the hydrocarbon-bearing subterranean reservoir from the processed seismic trace; penetrating the identified hydrocarbon-bearing subterranean reservoir with a hydrocarbon-producing well; and extracting hydrocarbon from the hydrocarbon-bearing subterranean reservoir using the hydrocarbon-producing well.

According to another aspect of the invention there is provided an apparatus for processing a seismic trace of a subterranean region, the apparatus comprising a processor configured to: (a) derive a seismic wavelet for a time-window of the seismic trace; (b) generate a model for the subterranean region corresponding to that time-window comprising a plurality of seismic reflectors by comparing the seismic wavelet with the time-window of the seismic trace to identify locations for the seismic reflectors, wherein the locations of the seismic reflectors are subject to a separation constraint requiring least some neighboring seismic reflectors to be separated by at least a minimum separation threshold which is greater than a separation corresponding to a sampling interval for the seismic trace; (c) define a model seismic wavelet having a model seismic wavelet amplitude spectrum with a frequency bandwidth which is greater than that of the seismic wavelet amplitude spectrum determined for the time-window of the seismic trace; (d) generate a model of the time-window of the seismic trace for the subterranean region based on the plurality of seismic reflectors of the model for the subterranean region and the model seismic wavelet.

According to an aspect of the invention there is provided a non-transitory computer program product bearing machine readable instructions for carrying out the method of the first aspect of the invention.

It will be appreciated that features and aspects of the invention described above in relation to the various aspects of the invention are equally applicable and may be combined with embodiments of the invention according to the different aspects of the invention as appropriate, and not just in the specific combinations described above.

BRIEF DESCRIPTION OF THE DRAWINGS

For a better understanding of the invention and to show how the same may be carried into effect reference is now made by way of example to the accompanying drawings in which:

FIG. 8 schematically represents pseudo-code for use in a step of the process of FIG. 3 in accordance with an embodiment of the invention;

DETAILED DESCRIPTION

Embodiments of the present invention will be described hereinafter and in the context of a computer-implemented system, method and computer program product which may be stored on a non-transitory medium. Although some of the present embodiments are described in terms of a computer program product that causes a computer, for example a personal computer or other form of workstation, to provide the functionality associated with some embodiments of the invention, it will be appreciated from the following description that this relates to only one example of some embodiments of the present invention. For example, in some embodiments of the invention, a network of computers, rather than a stand-alone computer, may implement the embodiments of the invention. Alternatively, or in addition, at least some of the functionality of the invention may be implemented by means of special purpose hardware, for example in the form of special purpose integrated circuits (e.g., Application Specific Integrated Circuits (ASICs)).

Figure 1:
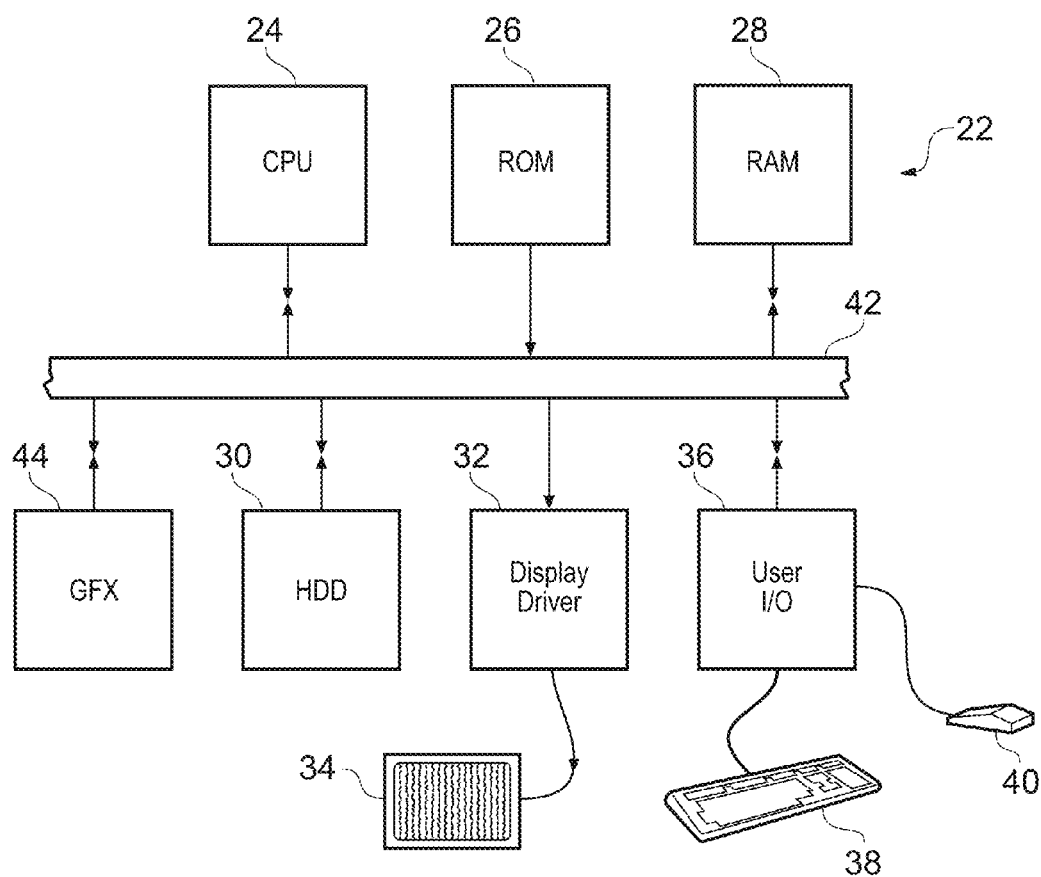
FIG. 1 schematically shows a computer for processing geophysical survey data in accordance with an embodiment of the invention.

FIG. 1 schematically illustrates a general purpose computer system 22 configured to perform processing of geophysical survey data in accordance with an embodiment of the invention. The computer 22 includes a central processing unit (CPU) 24, a read only memory (ROM) 26, a random access memory (RAM) 28, a hard disk drive 30, a display driver 32 and display 34 and a user input/output (IO) circuit 36 with a keyboard 38 and mouse 40. These devices are connected via a common bus 42. The computer 22 also includes a graphics card 44 connected via the common bus 42. The graphics card includes a graphics processing unit (GPU) and random access memory coupled to the GPU (GPU memory).

The CPU 24 may execute program instructions stored within the ROM 26, the RAM 28 or the hard disk drive 30 to carry out processing of geophysical survey data that may be stored within the RAM 28 or the hard disk drive 30. The RAM 28 and hard disk drive 30 are collectively referred to as the system memory. The GPU may also execute program instructions to carry out processing of geophysical survey data passed to it from the CPU.

Figure 2:
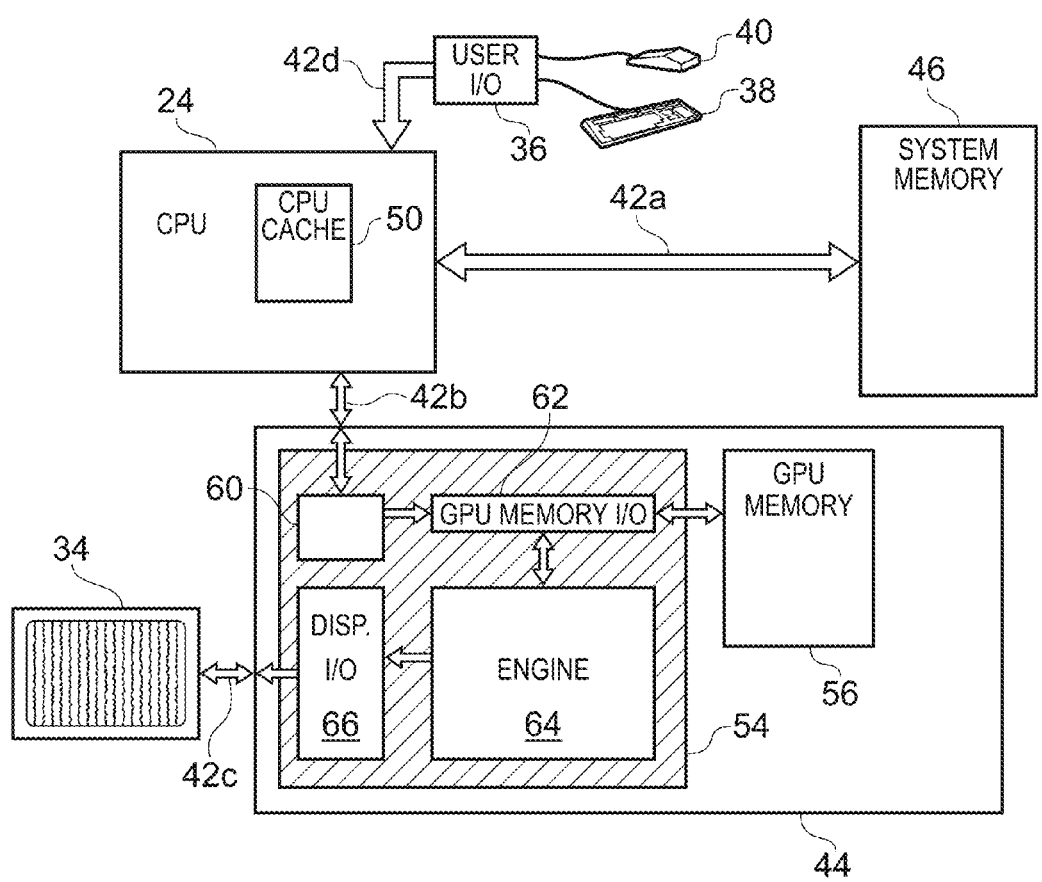
FIG. 2 schematically shows some of the features of the computer of FIG. 1 in more detail.

FIG. 2 schematically shows some of the features of the computer system shown in FIG. 1 in more detail. The RAM 28 and hard disk drive 30 are shown collectively as a system memory 46. Geophysical survey data is stored in the system memory. To assist in showing the different data transfer routes between features of the computer system 22, the common bus 42 shown in FIG. 1 is schematically shown in FIG. 2 as a series of separate bus connections 42a-d. A first bus connection 42a connects between the system memory 46 and the CPU 24. A second bus connection 42b connects between the CPU 24 and the graphics card 44. A third bus connection 42c connects between the graphics card 44 and the display 34. A fourth bus connection 42d connects between the user I/O 36 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66.

A user is able to select desired processing parameters using the keyboard 38 and mouse 40, for example in combination with a graphical user interface (GUI) displayed on the display 34 using a movable screen icon in combination with a mouse, track pad etc. to point and click, a touch screen or other known techniques in order to process geophysical survey data in accordance with an embodiment of the invention, Methods described herein can be used within a networked environment. For example, geophysical survey data may be stored centrally in an archive connected to a computer network provided with a number of workstations so that multiple users can access and process the geophysical survey data as needed. Additionally, users remote from the site may be permitted to access the geophysical survey data over the Internet.

Thus a user can access and process geophysical survey data in accordance with at least embodiments of the invention within the context of an otherwise conventional computer architecture. In accordance with some example embodiments of the invention, a computer implementation employing computer program code for storage on a data carrier or in memory can be used to control the operation of the CPU of the computer system. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

Having described some of the forms of apparatus which may be used in accordance with embodiments of the invention some processing methods in accordance with embodiments of the invention are described.

The background section described the use of wavelet inverse methods for processing seismic data and discussed their limitations with respect to the useable range of frequencies of the wavelet amplitude spectrum. An alternative to wavelet inverse methods is to derive an estimate of seismic reflectivity by parametric modeling. The model parameters might be, for example, the location and strength of the seismic reflection coefficients, and these would be estimated by fitting the input data (e.g. a recorded seismic trace) to a model of the input data (e.g. the convolution of a model of the reflectivity series and the seismic wavelet). A key advantage of such methods is that, when a priori information is supplied in the form of constraints on the derived reflectivity, the seismic reflectivity can be estimated to a higher resolution than is possible with wavelet inverse methods.

The resolution of parametric seismic trace inversion was investigated by Van Riel and Berkhout (1985) [2] through an analysis of the singular value decomposition of a matrix representation of the problem. From their analysis the authors were able to derive resolution curves that characterize the events produced by parametric inversion, these being equivalent to the output wavelet produced by wavelet inversion approach. For inversion of reflection amplitudes, the authors consider both the case where the number of model parameters (the number of reflection coefficients) is the same as the number of samples on the data trace, and also the case where the number of parameters is less than the number of data samples.

When the number of model parameters is the same as the number of data samples, parametric inversion resolves reflection amplitudes to the same degree as wavelet inversion; the output resolution curves closely resemble the output processed wavelet that would be obtained by wavelet inversion. The same considerations in relation to the noise content of the data apply here as discussed above in the background section. The resolution is limited by the useable frequency range of the wavelet, and the best that can be done is to flatten the wavelet amplitude spectrum within that frequency range and to zero the phase.

However, the situation changes when the number of model parameters is less than the number of data samples. The resolution curves (the output wavelets) are then narrower (in the time domain) than in the previous case. This implies that, for an equivalent input wavelet bandwidth and noise content, the resolution of parametric inversion is then better than that of wavelet inversion.

Figure 3A:
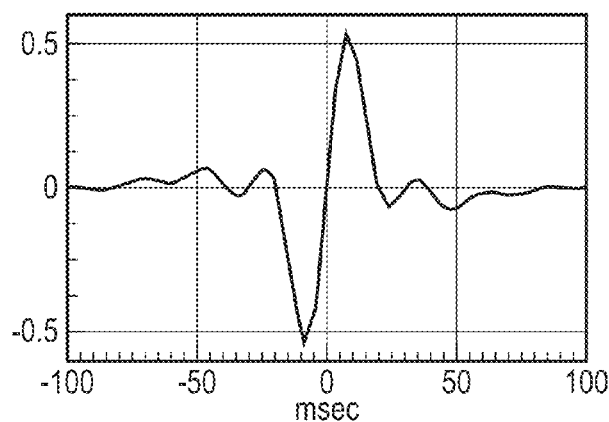
FIGS. 3A to 3C schematically demonstrate aspects of the seismic resolution obtainable from wavelet inverse methods.
Figure 3B:
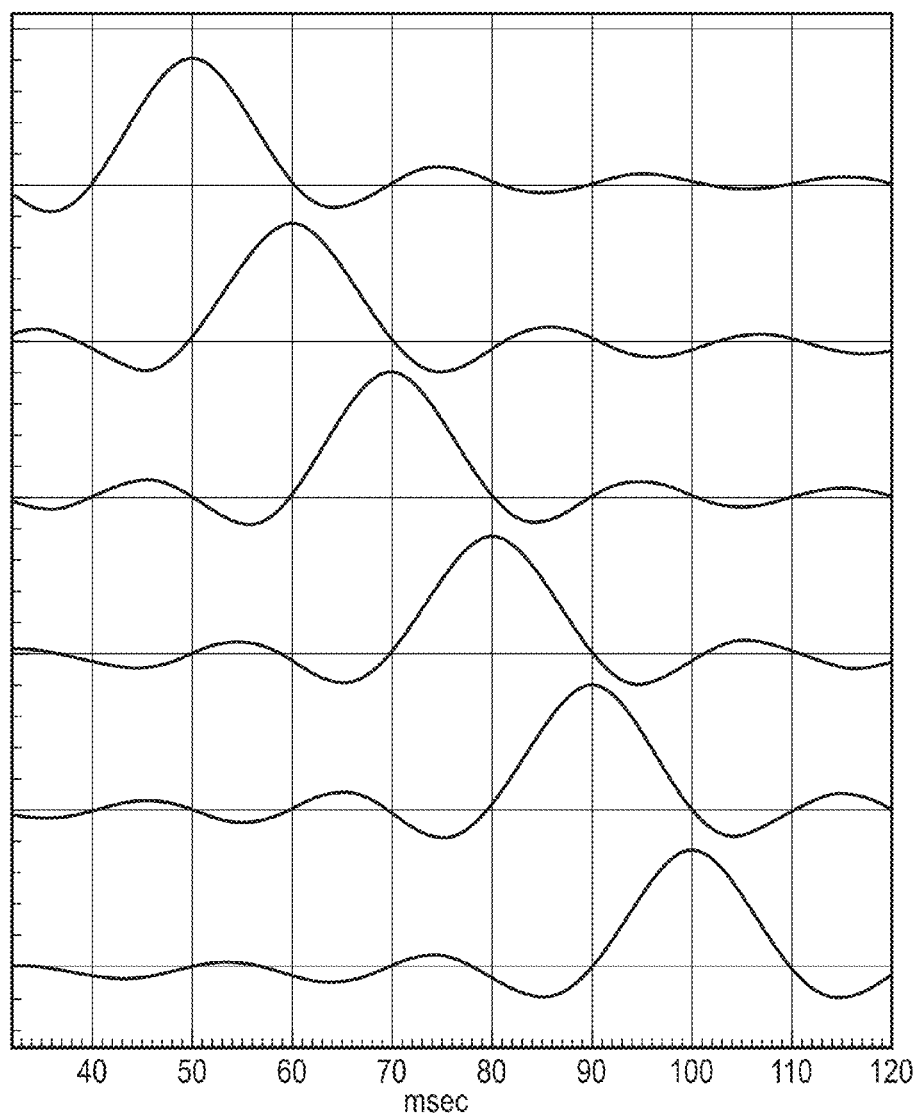
Figure 3C:
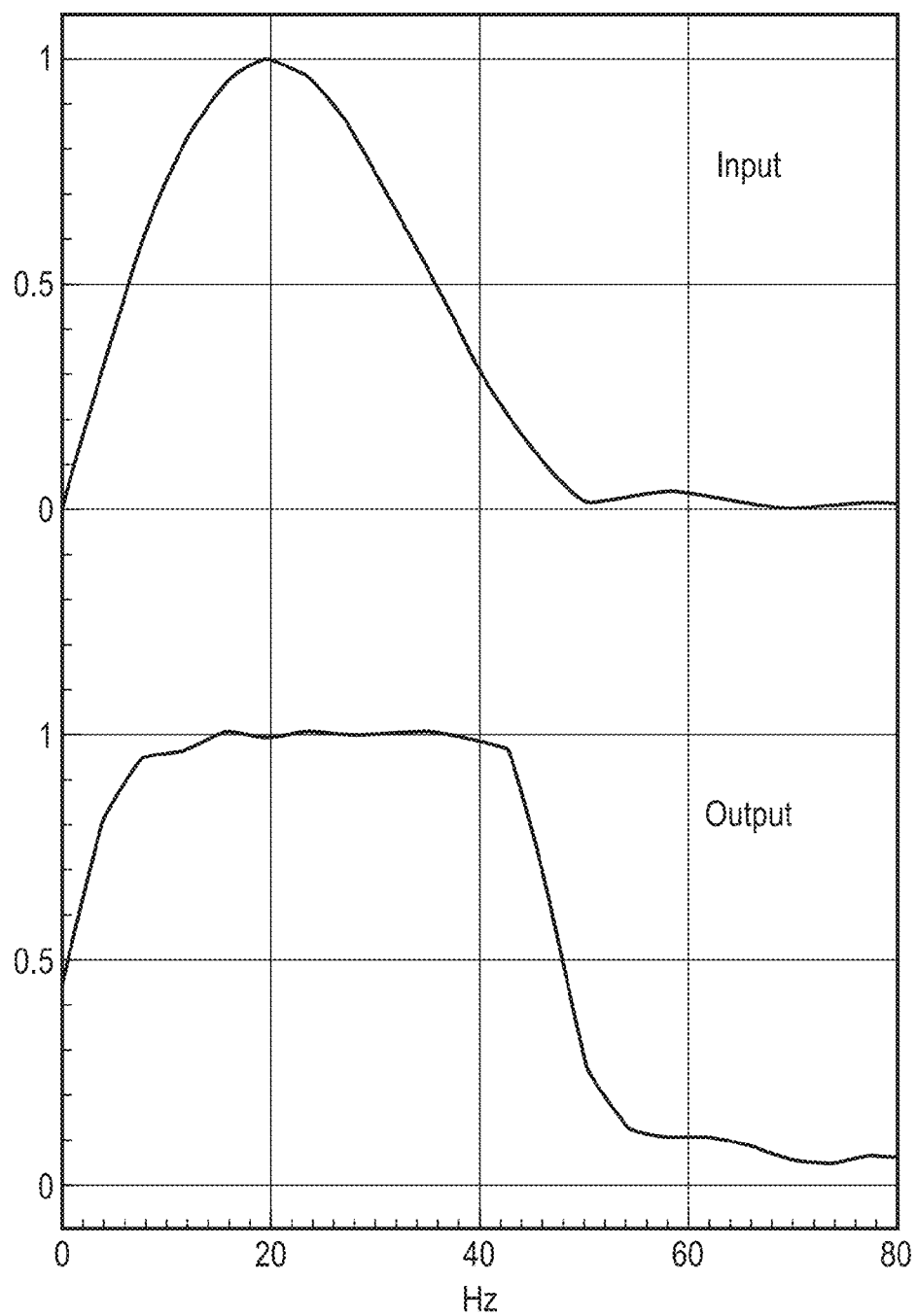

Thus for the input wavelet shown in FIG. 3A and for a given level of data noise, resolution curves of the type shown in FIG. 3B can be generated by the method of van Riel and Berkhout (1985) for the case where the number of model parameters is equal to the number of input data samples. The curves show events that inversion for reflection amplitudes will generate for each individual reflection, and in this case are all nearly identical apart from the time-shift associated with the reflection position. Any one of them can be taken as representing the output wavelet from wavelet inversion, which the parametric inversion is equivalent to in this case. The amplitude spectrum of a sample curve is shown in the lower part of FIG. 3C, with the amplitude spectrum of the input wavelet being shown for comparison in the upper part of the figure. From inspection of the resolution curves in FIG. 3B, or from the Kallweit and Wood (1982) resolution criterion and the cut-off frequencies of the amplitude spectrum in FIG. 3C, adjacent reflection events in the output from the inversion can be judged to be resolved to within a time separation of approximately 15 msec.

Figure 4:
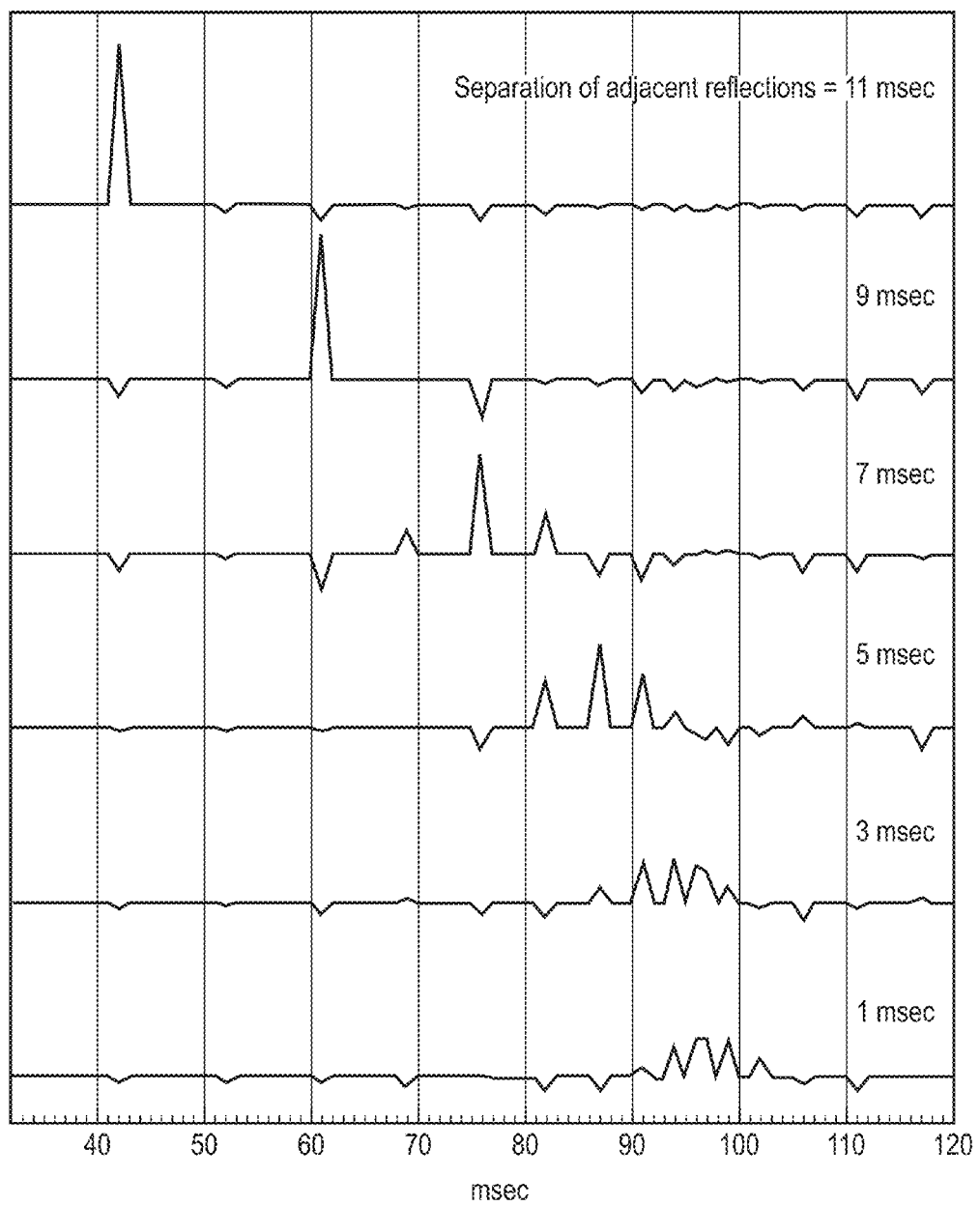
FIG. 4 is a schematically demonstrates aspects of the enhanced seismic resolution obtainable from sparse inversion methods.

Given the same input wavelet and assumed noise level as in FIG. 3, FIG. 4 shows resolution curves obtained for the alternative case where the number of model parameters in the inversion is less than the number of data samples. The resolution curves now vary according to the location and the separation of adjacent reflections in the model. In this example the underlying set of reflections are separated by times that vary from 11 msec to 1 msec as indicated in the figure. From inspection adjacent events are resolved down to a time separation of between 9 and 7 msec.

A reflection model that contains fewer reflection coefficients than the number of data samples can be referred to as a "sparse reflection model". A time-sampled representation of the model that has a sampling interval equal to that of the input data will have zero values at some of the sample positions. The ratio of the number of data values to the number of reflections in the model can be termed the "sparsity" of the reflection series; a sparsity of 2, for example, means that there is an average of one non-zero reflection sample value for every two data samples. The examples in FIGS. 3 and 4 indicate that, provided a sparse representation of the reflectivity is a valid model for the sub-surface, as will be assumed in the following discussion, parametric inversion is capable of estimating reflectivity to a greater resolution than wavelet inversion.

There are a variety of methods that have been developed for parametric inversion that aim to derive sparse representations of a reflection series. Collectively these are referred to as methods for "sparse inversion". The problem can, for example, be posed as least-squares inversion with an L1 norm constraint and then solved by a linear programming approach (see Levy and Fullagar, 1981 [3] and Oldenburg et al, 1983 [4] for example), by iteratively reweighted least-squares (Daubechies et al, 2010 [5]) or by basis pursuit (Chen et al, 1998 [6], Zhang and Castagna, 2011 [7]), for example. Other possible approaches are to estimate the reflectivity through a variety of either the matching pursuits algorithm described by Mallat, S. G. and Z. Zhang (1993) [8] or the orthogonal pursuits algorithm described by Pati et al (1993) [9].

It is a characteristic of such methods that, for a given sampling interval of the input data and of the estimated reflection model, the estimation error in the derived reflectivity generally decreases as the sparseness of the underlying reflectivity increases, and also decreases as the useable bandwidth of the input wavelet increases (i.e. as either the bandwidth of the wavelet increases or the noise level decreases).

Figure 5:
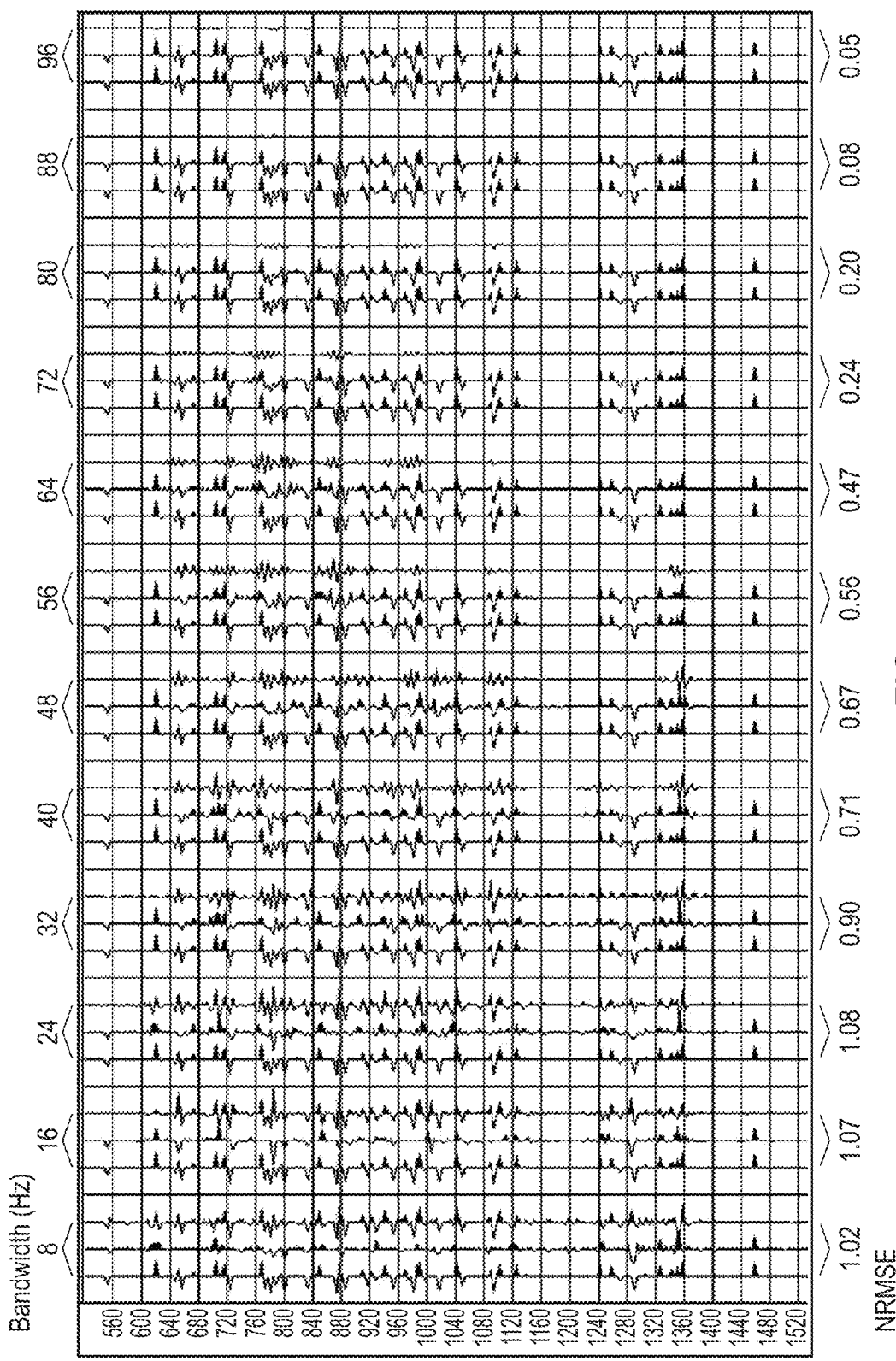
FIG. 5 is a schematically demonstration of errors generated by sparse inversion techniques and how this relates to the bandwidth of the input seismic trace.

FIG. 5 shows how the error in the reflectivity estimate derived by sparse inversion (in this case an orthogonal matching pursuits algorithm) varies with the bandwidth of the input data. To generate this figure synthetic traces of varying bandwidth were constructed at a 4 msec sampling interval from an underlying sparse reflectivity series which had an average of 1 in 5 non-zero reflection coefficients. For each bandwidth the reflectivity was then estimated at the 4 msec sampling interval of the input via orthogonal matching pursuits.

The results for each bandwidth are presented in the figure in groups of 3 traces:
1) The first (left-hand) trace in each group shows the synthetic reflectivity model used in each of the tests, and which is identical for each. The input data trace for each of the tests was generated by convolving this reflectivity series with a Butterworth filter of the labeled bandwidth (6 Hz low cut, 6 Hz+bandwidth high-cut).
2) The second (middle) trace in each group shows the reflectivity estimate produced by the orthogonal matching pursuits algorithm.
3) The third (right-hand) trace in each group shows the result of subtracting the estimated reflectivity (second trace) from the "true" reflectivity (first trace).

A measure of the error in the derived reflectivity at each input bandwidth was computed from the root mean-square value of the difference trace, the third trace in each group, normalized by the root mean-square value of the actual reflectivity. This is labeled in the figure as "NRMSE", the normalized root mean-square error in the derived reflectivity.

It can be seen from the figure that the error decreases as the bandwidth of the wavelet increases. By inspection, the error in the derived reflectivity might be judged to be acceptable at or below an NRMSE value of 0.5, in the sense that the errors would not prevent identification of the different events in the derived model. This corresponds to an input bandwidth of 64 Hz or greater.

The results shown in FIG. 4 indicate how the error in sparse inversion at a constant input bandwidth changes as the spacing changes between the reflection coefficients. In FIG. 5 on the other hand the reflection coefficients are estimated for varying bandwidths but at a constant minimum separation that is equal to the 4 msec sampling interval of the estimated reflectivity. The results in FIG. 5 therefore demonstrate that a bandwidth of at least 64 Hz can be helpful to resolve events to a minimum spacing of 4 msec when the reflection series has a sparsity of 5.

We could interpret the results in FIG. 5 in a slightly different way. We might take the Nyquist frequency of the output—125 Hz—as an approximate measure of the upper frequency of the estimated reflectivity. So we could alternatively describe the results in FIG. 5 as demonstrating that when the reflection series has a sparsity value of 5 an input bandwidth of 64 Hz is required to obtain an acceptable result to an upper output frequency of approximately 125 Hz.

Figure 6:
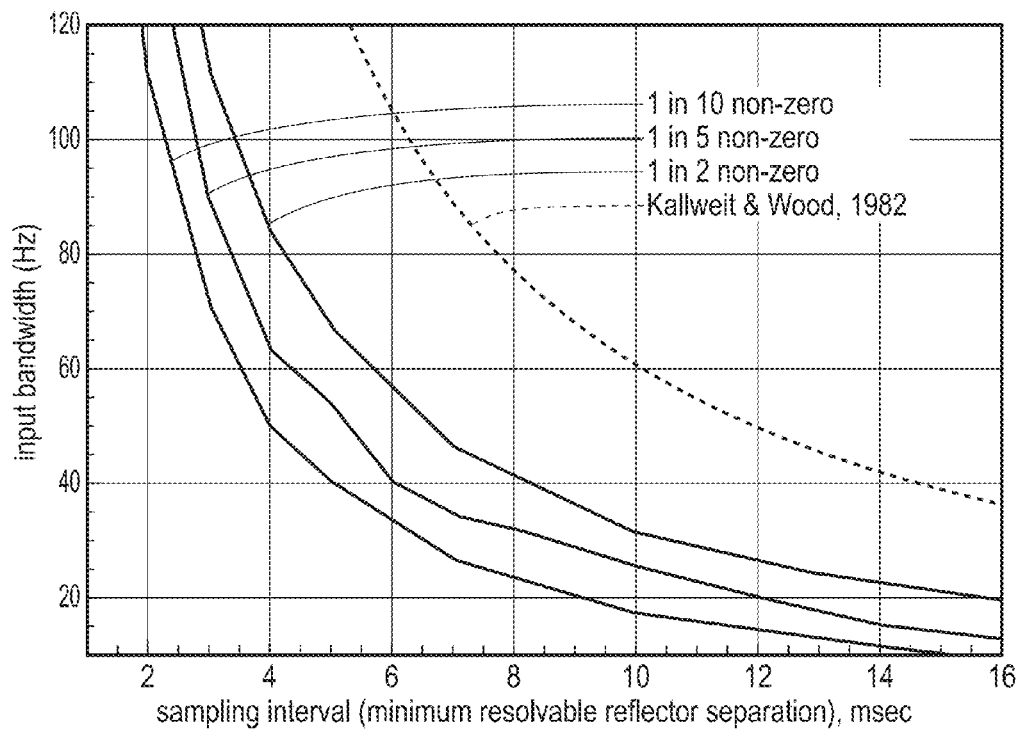
FIG. 6 is a generalized representation of aspect of the results presented in FIG. 5 for a range of bandwidths and reflection sparsities.

The curves plotted in FIG. 6 were constructed for a set of synthetic tests similar to those shown in FIG. 5, but for three different levels of reflection sparseness as indicated in the figure. Reflectivity estimates were obtained by sparse inversion, again using an orthogonal matching pursuits algorithm, for a range of input bandwidths and also now for a range of sampling intervals. For each sampling interval, FIG. 6 gives the minimum bandwidth that might be considered to produce an acceptably low level of error in the derived reflectivity (an NRMSE value less than or equal to 0.5). Since the sampling interval of the computation defines the minimum allowed separation of the estimated reflections, the figure shows the minimum bandwidth that is required to resolve reflectors with a particular minimum reflection separation, for each of the three different levels of reflection sparsity. Thus, for example, to resolve events at a minimum spacing of 6 msec, a minimum bandwidth of 55 Hz is required at a sparsity value of 2; for a minimum spacing of 4 msec and a sparsity of 5 the required minimum bandwidth is approximately 65 Hz.

FIG. 6 also shows the equivalent resolution versus bandwidth curve that derives from the Kallweit and Wood (1982) resolution criterion. For the Butterworth filter used to represent the wavelet in the tests in FIGS. 5 and 6, we would expect that the output wavelet from wavelet inverse processing would have a fairly similar bandwidth to that of the input wavelet. This curve therefore also gives an approximate indication of the resolution we might expect here for the output from wavelet inverse processing. Comparing the Kallweit and Wood curve with the other curves in FIG. 6 we can conclude that, for the range of reflection sparseness values in the figure, an approximate rule of thumb might be that the minimum reflection separation that can be resolved by wavelet inversion is between 1.5 and 2 times that which can be resolved by sparse inversion.

Again, if we take the Nyquist frequency corresponding to a particular sampling interval as an approximate measure of the upper frequency of the estimated reflectivity, we could loosely describe the results in FIG. 6 as demonstrating the relationship between the input and output bandwidth of sparse inversion. The results for this example would suggest that for this range of reflection sparseness, sparse inversion can have an acceptable degree of error for bandwidths of up to 1.5 to 2 times the bandwidth of the input to the inversion, and this is approximately 1.5 to 2 times the bandwidth of the output that would be obtained from wavelet inversion.

The dependence of the error on the bandwidth of the input, and the possibility of reducing the error by increasing the sampling interval at which the inversion is performed, is an aspect of sparse inversion that has generally been ignored in past applications of this type of process. The inversion is usually applied at the sampling interval of the input data, regardless of whether the input bandwidth is sufficient to produce an acceptably low level of error at that sampling interval. This is the reason why other constraints, well information for instance, are sometimes needed within such applications, in order to reduce the degree of output error to an acceptable level.

When the objective of the inversion is to increase the frequency content of the data, as in accordance with some embodiments of the present invention, the inventors have recognized it can in some circumstances be appropriate to perform the inversion at the sampling interval that produces an acceptable level of error for a given input data bandwidth. A frequency extended version of the input trace can then be obtained by convolving a derived reflectivity with a frequency extended version of the input wavelet. The behavior demonstrated in FIGS. 5 and 6 can be considered to characterize the degree of bandwidth extension that can be obtained for a particular sparsity of the reflection series.

Embodiments of the invention provide methods and apparatus for processing a seismic trace of a subterranean region which in some respects build on the above-described techniques. Aspects of obtaining geophysical survey data and processing data in accordance with embodiments of the invention which are common to established techniques are not described here in detail in the interest of brevity it being understood that conventional techniques may be used where appropriate. Furthermore, it will be appreciated that embodiments of the invention may be applied for any form of seismic trace, for example a seismic trace for a single source-receive pairing, or any form of stacked seismic trace (i.e. processing in accordance with embodiments of the invention may be applied pre- or post-stacking). Furthermore, embodiments of the invention may be applied in conjunction with other processing techniques. For example, embodiments of the invention may be applied to a seismic trace that has already been subject to another form of processing.

In a general sense, some embodiments of the invention may be seen as providing processing of seismic survey data by implementing a sparse seismic inversion to establish characteristics for subterranean reflectors with constraints on the separation between adjacent (neighboring) reflectors. In particular, in accordance with embodiments of the invention, reflectors may be required to be separated by at least a minimum threshold separation which is greater than a separation corresponding to a sampling interval of the seismic trace.

Figure 7:
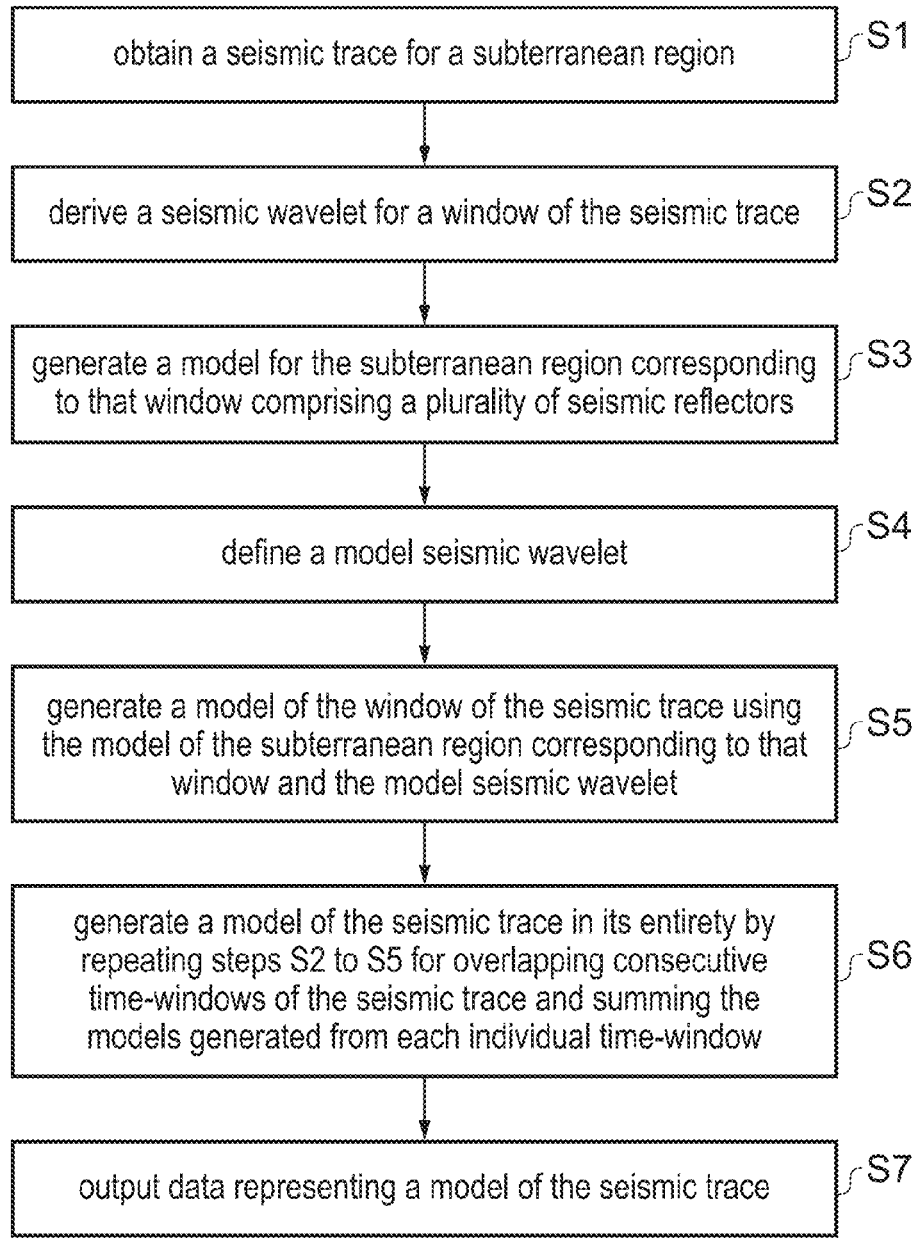
FIG. 7 is a flow chart schematically representing a processing flow in accordance with an embodiment of the invention.

FIG. 7 is a flow diagram schematically representing processing in accordance with an embodiment of the invention.

In a first Step S1, a seismic trace for a subterranean region is obtained. As noted above, the seismic trace may be any conventional form of seismic trace. The seismic trace may, for example, have been previously generated and obtaining the seismic trace may comprise retrieving the seismic trace from a database. Alternatively, the seismic trace may be obtained as a result of a previous processing step in a longer analysis chain. In principle the seismic trace may even be obtained as a direct result of an ongoing seismic survey (i.e. the processing may be applied in "real time" when collecting survey data). As is well understood, the seismic trace will typically comprise data measurements as a function of time (broadly corresponding to a round-trip travel time between the Earth's surface and a subterranean layer at a depth associated with each sample such that time is a proxy for, and may be used inter-changeably with, layer depth).

In Step S2 a seismic wavelet is derived for a time-window of the seismic trace. The seismic wavelet may be derived in any conventional manner. In some embodiments of the invention the amplitude spectrum of the seismic wavelet may be derived through autocorrelation of the time-window of the seismic trace (under the standard assumptions of whiteness and stationarity that are applied in processes such as predictive deconvolution). The phase of the wavelet may be represented by a constant phase rotation which may be arbitrary, e.g. zero. As discussed further below, in some example implementations processing in accordance with embodiments of the invention may be performed multiple times with different constant phase rotations for the seismic wavelet to determine which value(s) provide the best results.

In Step S3 a model for the subterranean region is generated corresponding to that time-window. The model comprises an indication of the location and strength of a plurality of seismic reflectors in the subsurface and is obtained by comparing the seismic wavelet with the time-window of the seismic trace. In accordance with embodiments of the invention, the locations of the seismic reflectors are subject to a separation constraint requiring at least some neighboring seismic reflectors to be separated by at least a minimum separation threshold which is greater than a separation corresponding to a sampling interval for the seismic trace. Typically the constraint may be such that no neighboring seismic reflectors may be separated by less than the minimum separation threshold, but that is not to say in some example implementations there may be one or two reflectors which are allowed to be more-closely spaced.

The model may be generated using techniques based around sparse seismic inversion techniques.

In this example it is assumed the model generated in Step S3 of FIG. 7 is generated using an orthogonal matching pursuits algorithm. An orthogonal matching pursuits algorithm is an iterative algorithm that, in its general form, can be used to decompose a time series into a set of non-orthogonal basis functions. In matching pursuits, the decomposition proceeds by iteratively matching and subtracting the best fitting component from the time series at each step of the iteration to establish the location and strength of an individual subterranean reflector. In orthogonal matching pursuits there is an additional least-squares matching step in each iteration that adjusts the strengths of the components identified to that point.

Thus, in accordance with the processing of FIG. 7, an estimate of the reflectivity of a time-window of the input seismic trace is made using an orthogonal matching pursuits algorithm. The algorithm proceeds by sequentially identifying events in the data residual at each iteration through, for example, correlation with the seismic wavelet, with the value and location of the maximum of the correlation being taken as an estimate of the strength and location of the reflection identified at that iteration (subject to the above-mentioned constraints). The amplitudes of all the reflections that have been identified up to a particular iteration (but not their locations) are adjusted to best match the data by least-squares matching (via, for example, a conjugate gradients algorithm), after which an updated data residual for the next iteration is obtained by subtracting the updated data model from the original data. The iterations stop either when the normalized RMS value of the residual becomes less than a specified threshold, or when the maximum allowed number of iterations have been completed. A schematic "pseudo code" representation of this process is shown in FIG. 8.

In FIG. 8 the "input data trace" is the seismic trace of Step S1 of FIG. 7 and the "wavelet" corresponds with the "seismic wavelet" of Step S2 of FIG. 7. The reflectivity (reflections) is a representation of a series of reflectors in the subterranean region which are determined to give rise to the time-window of the input data trace having regard to the properties of the assumed seismic wavelet.

As noted above, an aspect of embodiments of the invention is the application of additional constraints in the generation of the model of the subterranean region in Step S3 which imposes a minimum separation of the reflector locations in the derived subterranean reflectivity series representing the model.

In principle, this minimum separation requirement can be applied by simply restricting the locations over which the wavelet is correlated with the seismic trace in the iterative process represented in FIG. 8 to locations separated from the reflector locations determined in previous iterations by at least the minimum separation threshold.

However, another way of imposing the separation constraint which may be preferred in some example implementations is to re-sample the input seismic trace prior to computing the model reflectivity series in Step S3 to a sampling interval corresponding to the minimum separation threshold and to perform the orthogonal matching pursuits computation at that sampling interval. Accordingly, a reflector may be allowed at each and every location corresponding to each sample in the re-sampled trace while ensuring these reflectors are still separated by at least the minimum separation threshold.

As explained further below, an aspect of embodiments of the invention is the provision of a modified seismic trace having an increased frequency bandwidth (frequency content) as compared to the input seismic trace. In principle, a user can apply processing in accordance with an embodiment of the invention to derive a modified seismic trace having any desired frequency bandwidth. That is to say, the frequency bandwidth of the modified seismic trace may be selected by a user as a parameter of the processing. In accordance with some embodiments of the invention, a resampling interval may be selected based on the user-desired frequency content of the modified seismic trace. For example, the re-sampling interval may be related to the upper frequency $f_{upper}$ associated with the desired frequency content of the modified seismic trace such that the re-sampling interval=$1/(2 \times f_{upper})$. After the computation of the derived reflectivity series representing the model of the subterranean region in Step S3, the model may be resampled back to the sampling interval of the non-resampled seismic trace obtained in Step S1

The test results in FIGS. 5 and 6, together with similar results in van Riel and Berkhout (1985), show that the accuracy of the reflectivity series derived by parametric inversion increases as the minimum separation between the model reflector locations increases; the error in the derived reflectivity series is reduced by constraining the minimum separation between the derived reflector locations, using for example the re-sampling described above. In an embodiment of the invention that provides for a modified seismic trace having an increased frequency bandwidth as compared to the input seismic trace it may be considered sufficient for the derived reflectivity to be accurate within the frequency range of the desired output frequency bandwidth. When, for example, the constraint on minimum separation of the reflector locations is applied by resampling, it may be considered sufficient to choose a re-sampling interval that is related to the upper frequency of the desired output bandwidth, in the manner described above.

In accordance with some example embodiments the choice of constraints on the minimum separation, such that the derived model is adequate for provision of increased frequency bandwidth whilst reducing the error that would be present in the derived model in the absence of such constraints, can be a key aspect of this processing, which has in some respects been neglected in previous schemes.

The approach of constraining the minimum separation between reflector locations differs from other approaches for performing sparse inversion, which generally do not include such constraints and are generally based on the sampling interval of the input data. Depending on the bandwidth of the input seismic trace and other characteristics of the data, conventional approaches may contain unacceptable errors in the derived reflectivity model. Accordingly, well data or other constraints may be required with established techniques to help stabilize the processing and reduce the risk of such errors, as in Pendrel and van Riel, 2000 [10], Wang, 2010 [11].

Thus, the result of processing Step S3 in FIG. 7 is a model for the subterranean region comprising a plurality of reflector locations and strengths with the reflector locations subject to the above-described separation constraint. Because of the separation constraint there are necessarily fewer reflectors than samples in the input time-window of the seismic trace. Furthermore, the number of reflectors may be further constrained, for example such that the number of reflectors comprising the model of the subterranean region is less than or equal to an upper limit which is a non-unity fraction of the number of samples comprising the time-window of the seismic trace. The non-unity fraction may be, for example, 0.50, 0.45, 0.40, 0.35, 0.30, 0.25, 0.20, 0.15, 0.10, 0.09, 0.08, 0.07, 0.06, 0.05, 0.04, 0.03, 0.02 or 0.01. This constraint may be applied, for example, by limiting the number of iterations through the orthogonal matching pursuits algorithm schematically represented in FIG. 8 so as to identify the corresponding restricted number of reflector locations/strengths. In this respect, the "sparsity" of the model for the subterranean region may be readily selected, if desired, depending on the nature of the geology within that region. For typical geologic sequences sparsity values of the order of 2 to 5 generally provide an adequate representation of the reflectivity.

In Step S4 of the processing of FIG. 7 a model seismic wavelet is defined that is based on a desired frequency content (bandwidth) for a modified version of the time-window of the input seismic trace obtained in Step S1 of the processing. The definition of the model seismic wavelet is to a large extent user-selected according to the implementation at hand. It is expected that in practice a user may define a range of different frequency bandwidths for the model seismic wavelet in different iterations of the processing of FIG. 7 to establish which model seismic wavelet is perceived to provide the best overall results.

In a simple example, the model seismic wavelet may simply follow a top-hat type function that is smoothed in some way (to reduce ringing) and is defined by a characteristic lower frequency and upper frequency and a constant phase. As a specific example, a Butterworth-type filter response having −3 dB points at user-selected lower and upper frequencies and a constant phase may be defined. The phase for the model seismic wavelet may be set to a constant arbitrary value, such as 0°. Alternatively, the processing of Steps S2 and S3 may be repeated with different phases associated with the seismic wavelet amplitude spectrum derived in Step S2 used for generating the model of Step S3, and whichever phase value provides the best model for the subterranean region (i.e. the one which when convolved with the seismic wavelet of Step S2 most closely resembles the time-window of the seismic trace obtained in Step S1) is then used as the phase for the model seismic wavelet in Step S4.

A lower frequency cut-off for the model seismic wavelet may be chosen to correspond to an estimate for the lower frequency cut-off associated with the amplitude spectrum of the seismic wavelet derived in Step S2 for the time-window of the input seismic trace. A higher frequency cut-off for the model seismic wavelet may be chosen to provide an extended frequency content as compared to the derived seismic wavelet amplitude spectrum of Step S2, for example to extend the bandwidth by a factor of 2 or so, or other factor. In principle the extent to which the bandwidth is extended may be freely selected by a user, but attempting to introduce too great an extension of bandwidth will generally introduce unrealistic artifacts in the resulting output modified seismic trace. Thus, in a typical implementation, a user may process a seismic trace in accordance with an embodiment of the invention a number of times using different extensions of bandwidth for defining the model seismic wavelet in Step S4 and determine which provides the best results. If well-log information is available then the accuracy of the output modified seismic trace for different bandwidth extensions may be established by comparison with modeled ("synthetic") seismic traces derived from the well-log information. If such well-log information is not available then, as is often the case in seismic processing, assessment of the output modified trace will require an element of subjectivity on behalf of the user. For example, the experienced user will be able to identify features in a modified version of the seismic trace determined in accordance with an embodiment of the invention which incorporates what are perceived to be unrealistic type features which are introduced by extending the bandwidth by more than the data can support. In this case, the user can re-run the processing with a smaller bandwidth extension. Generally speaking, the best results will be obtained using the largest bandwidth for the model seismic wavelet which does not start to introduce unacceptable artifacts in the output data.

The degree of bandwidth extension that can be reliably obtained is a function of the sparsity of the reflection series and the noise content of the input data. For reflection sparsities of the order of 5 and for the noise levels typically present it has been found that the bandwidth can readily be extended by a factor of around 1.5 to 2. However, given the variability between seismic traces from different surveys, or after different pre-processing, it may generally be preferable to establish the amount of bandwidth extension that is judged to give acceptable results through tests such as described above.

In Step S5 of the processing of FIG. 7 a model of the time-window of the seismic trace is generated based on the plurality of seismic reflectors of the model for the subterranean region corresponding to that window generated in Step S3 and the model seismic wavelet defined in Step S4. This is done in this example by convolving the model seismic wavelet with the series of seismic reflectors comprising the model for the subterranean region taking account of the respective locations and strengths of the reflectors.

The result of Step S7 of the processing of FIG. 7 is what is effect a modified version of the input seismic trace obtained in Step S1. This may be referred to as a model seismic trace and represents an output of the processing in accordance with an embodiment of the invention. The modified seismic trace may be used (i.e. viewed or further processed) according to any conventional techniques which might otherwise be used in conjunction with the input seismic trace of Step S1. Thus, the model seismic trace may be outputted for viewing, for example on a display screen of a computer, or otherwise further processed, for example in a conventional manner that might otherwise be applied to the seismic trace obtained in Step S1 before modification in accordance with an embodiment of the invention. The step of outputting data representing the model seismic trace is schematically represented in Step S7 of the processing of FIG. 4.

Thus, as described above, in accordance with embodiments of the invention an input seismic trace may be modified to provide a model seismic trace which is built using a constrained model of the subterranean region derived from the input seismic trace and a seismic wavelet amplitude spectrum derived from the input seismic trace which is combined with a model seismic wavelet that defines a desired frequency content for the model seismic trace.

The inventors have found this approach to provide a modified version of the seismic trace which has an enhanced resolution as compared to the input seismic trace. Thus the model seismic trace can additionally be used in seismic interpretation to build higher resolution models of structure and stratigraphy than are possible using the lower resolution seismic input trace. It can be input into a pre- or post-stack seismic inversion process to recover acoustic and/or elastic impedance, density, or other seismic attributes, which can then be used to determine, at higher resolution than possible using the input trace, the lithology and/or fluid properties of subterranean strata.

As discussed earlier, the improvement of resolution is in some respects a consequence of constraining the number of reflectors comprising the model of the subterranean region to less than the number of samples comprising the seismic trace. When the number of reflections is equal to the number of samples the reflectivity is estimated to a resolution that is the same as that obtained by wavelet inversion. With fewer reflections, each reflection is then estimated to a greater resolution. Hence the model trace constructed from the derived reflectivity is capable of being constructed at an enhanced resolution, and by implication with a greater frequency content, than the input seismic trace.

Having described methods for processing seismic trace in accordance with some embodiments of the invention, a demonstration of some example results that can be achieved is provided.

Figure 9A:
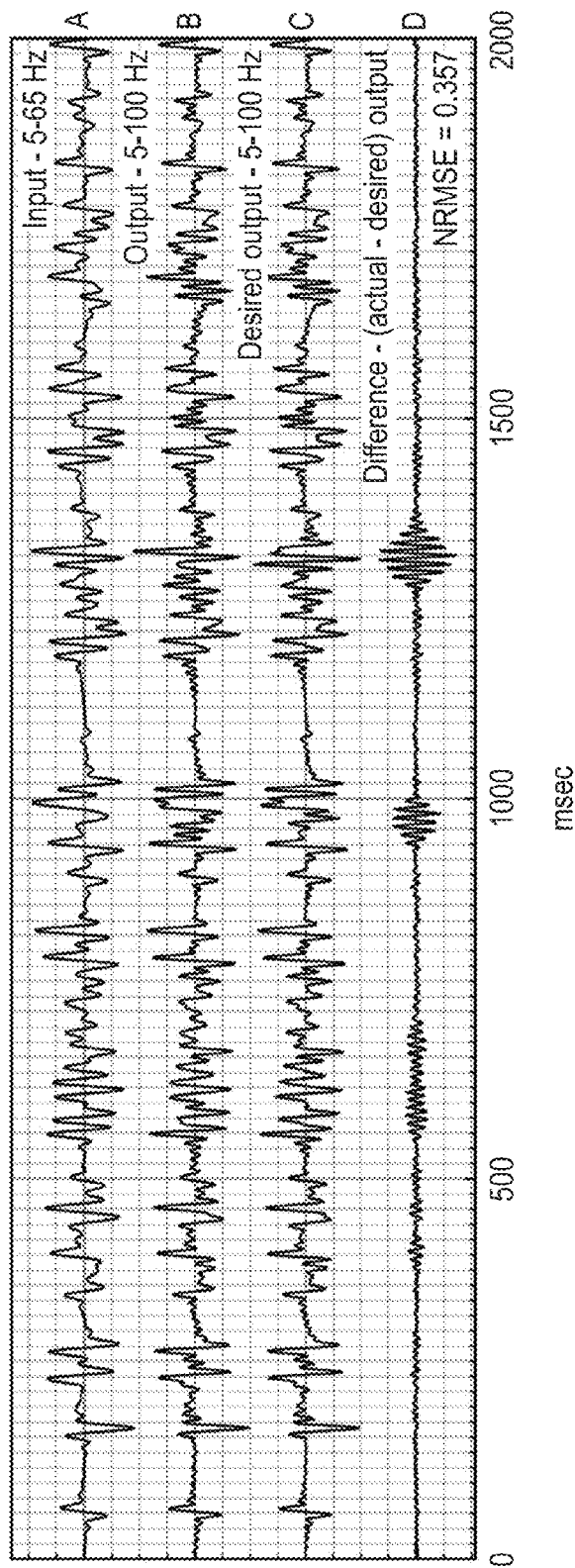
FIGS. 9A and 9B schematically show example results from processing a synthetic seismic trace in accordance with embodiments of the invention.
Figure 9B:
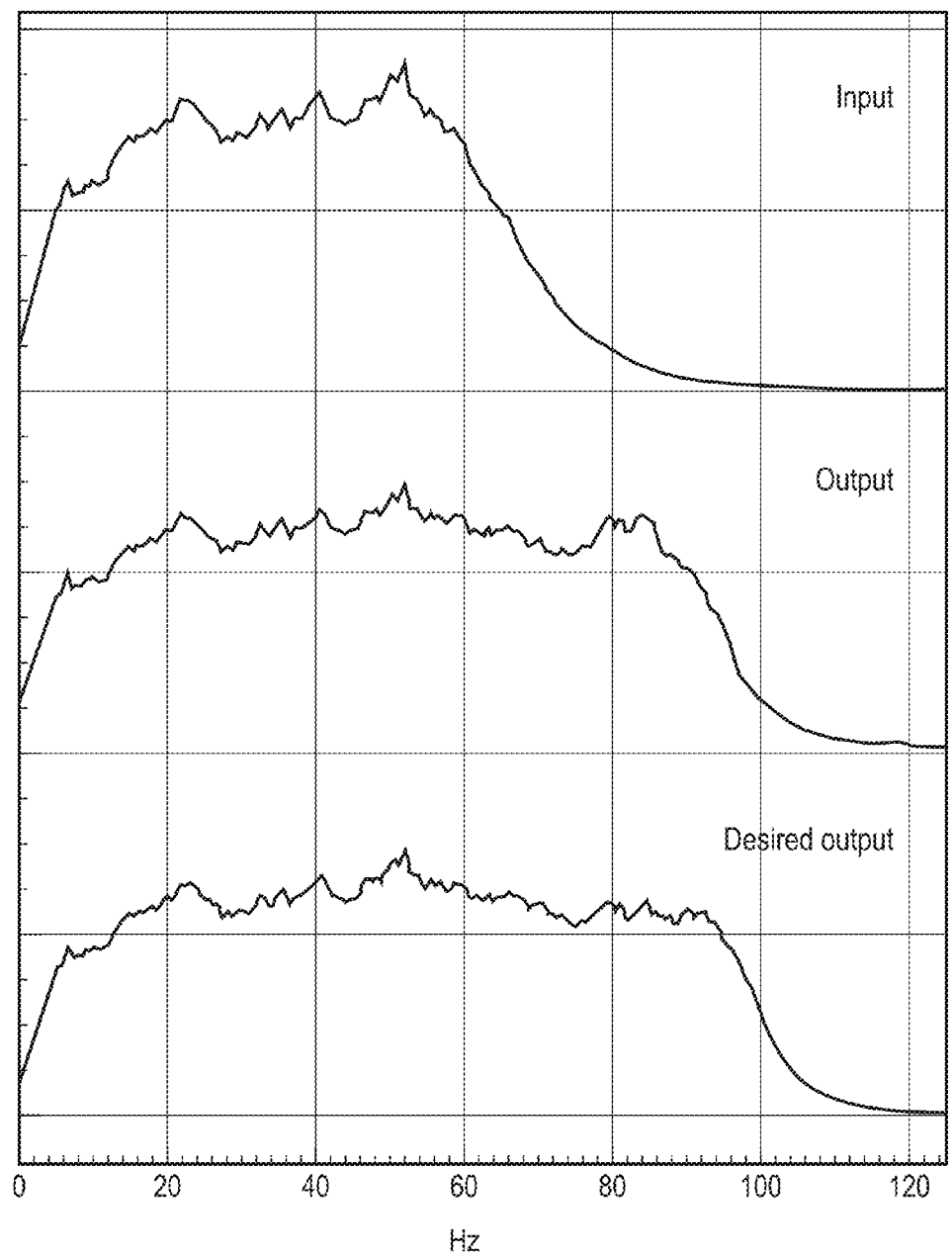

FIGS. 9A and 9B represent a synthetic (modeled) demonstration of processing in accordance with embodiments of the invention for extension of the frequency range of a seismic trace. In these figures the result of such processing is compared with a synthetic trace prior to the processing and also compared with the modeled, synthetic, desired end result of such processing.

The upper trace (labeled A) in FIG. 9A schematically shows a synthetic seismic trace that was generated by convolving a 90°, 5 to 65 Hz, Butterworth filter with a synthetic reflectivity series that had, on average, one non-zero reflection for every 5 sample positions, corresponding to a sparsity value of 5. The bandwidth/resolution curves in FIG. 6 show that for a 60 Hz bandwidth and sparsity of 5 it is possible to invert to a minimum reflection spacing of 5 msec, corresponding to an output upper frequency of 100 Hz.

The trace labeled B in FIG. 9A schematically shows the output obtained from frequency extension processing implemented according to an embodiment of the invention. The result shown here was obtained by sparse inversion implemented via orthogonal matching pursuits, constrained to produce a reflectivity estimate at a minimum spacing of 5 msec. The trace shown in the figure was produced by convolution of the reflectivity series generated by the sparse inversion with a 5 to 100 Hz Butterworth filter, the phase of the filter being equal to a wavelet phase estimated during the inversion process. Comparison of the second trace with the first trace in the figure shows the degree of frequency extension and hence the enhanced resolution that can be obtained by this procedure.

In this synthetic case the underlying reflectivity that was used to generate the input trace is known, and a further synthetic trace can be generated at the desired extended frequency range by convolving the known reflectivity with a frequency extended wavelet of the known phase. This is the result that would be obtained from perfect processing of the input trace and is designated as the "desired output" and labeled C in FIG. 9A. The trace labeled D in FIG. 9A is the difference between the actual and the desired output. Shown also is the normalized root mean-square error (NRMSE=0.357) of the difference trace, which is the ratio of the rms (root mean square) of the difference trace to the rms of the desired output.

The figure shows that the larger errors in the output are limited to a few isolated parts of the trace. In general the output trace contains close to the correct events even at those positions, even though events here may be slightly shifted or amplitude distorted. The procedure also does not appear to have generated any significant additional spurious events.

FIG. 9B shows amplitude spectra for the input (A), actual (B) and desired output (C) traces of FIG. 9A. These spectra confirm that the frequency extension in the output trace closely matches that seen in the amplitude spectrum of the desired output.

Figures 10A, 10B:
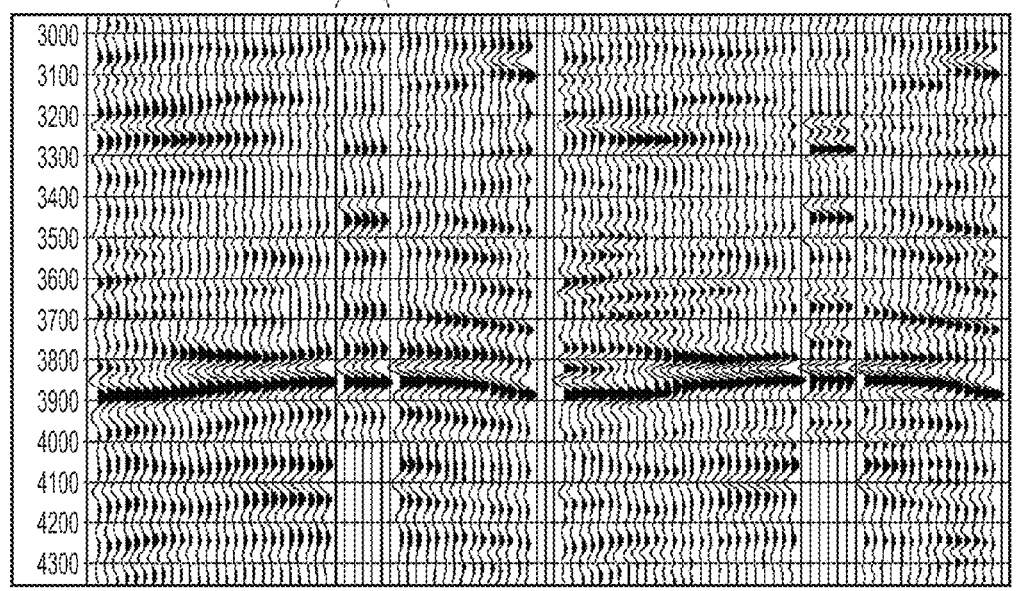
FIG. 10A schematically represents broadly a conventional seismic trace along with a synthetic seismic trace generated from well log data.
FIGS. 10B to 10D schematically represent results from processing the seismic trace of FIG. 10A in accordance with embodiments of the invention for different frequency extensions.
Figures 10C, 10D:
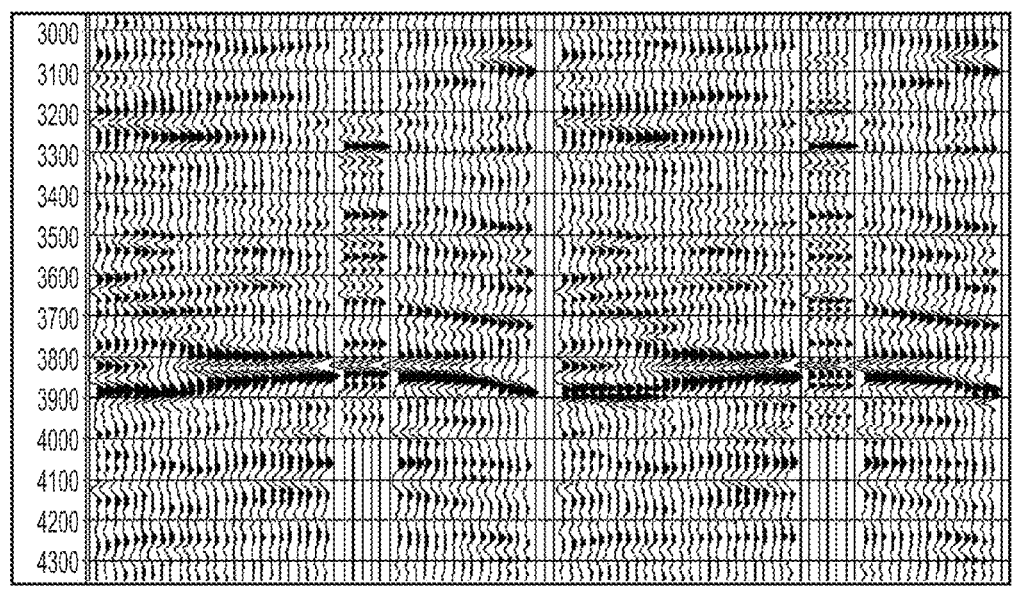

FIG. 10A schematically shows a conventional representation of a plurality of seismic traces for a plurality of locations over a subterranean region of interest. As well as representing the seismic traces, also shown in FIG. 10A is a synthetic trace obtained from well log data from the region. The synthetic well log trace is duplicated five times to provide a series of adjacent identical traces to aid comparison with other parts of the figure. The synthetic well log traces are generated by filtering reflectivity estimates from the well log data according to the bandwidth content estimated for the seismic traces in the region. The frequency bandwidth of the input seismic traces is on the order of 10 Hz, depending on depth. Each individual trace in FIG. 10A may be processed in accordance with the above-described techniques to generate a modified trace. The result of doing this is represented in FIGS. 10B, 10C and 10D for three different bandwidths of model seismic wavelet derived in Step S4 of the processing of FIG. 7. In each case the model seismic wavelet has the same lower frequency cut-off (around 7.5 Hz) and respective higher frequency cut-offs of 25 Hz, 35 Hz and 45 Hz, as indicated to the lower left of each figure. As with FIG. 10A, FIGS. 10B, 10C and 10D also include representative synthetic traces based on the well log data. In each case the well log reflectivity is filtered according to the bandwidth for the model seismic wavelet to provide a like-for-like comparison.

It can be seen from FIGS. 10A to 10D that processing in accordance with embodiments of the invention allows features in the subterranean strata to become better resolved in modified traces generated in accordance with embodiments of the invention as compared to the input seismic traces. For example, a comparison of FIG. 10D with FIG. 10A shows that the input data is unable to resolve the strong feature between around 3800 and 3900 milliseconds as two distinct events, whereas the bandwidth-extended modified traces determined in accordance with the embodiment of the invention represented in FIG. 10D are starting to resolve these two features.

Thus, it can be seen that processing in accordance with the technique described above allows for the provision of a modified seismic trace containing what is in effect an extended bandwidth of frequency content as compared to an input seismic trace, thereby aiding the resolution of subterranean features.

Some significant aspects of some embodiments of the invention as compared to previously known techniques may be summarized as follows.

Processing in accordance with some embodiments of the invention uses sparse inversion techniques as an initial step in a frequency extension exercise for geophysical seismic data.

Processing in accordance with some embodiments of the invention applies constraints that limit the minimum separation of estimated reflections (e.g. by resampling prior to the sparse inversion), and which limit the inversion to the resolution needed for the spectral extension.

Processing in accordance with some embodiments of the invention does not need well information.

Processing in accordance with some embodiments of the invention estimates a seismic wavelet as part of the inversion process.

Processing in accordance with some embodiments of the invention does not need a wavelet extracted by well-tie.

Figure 11:
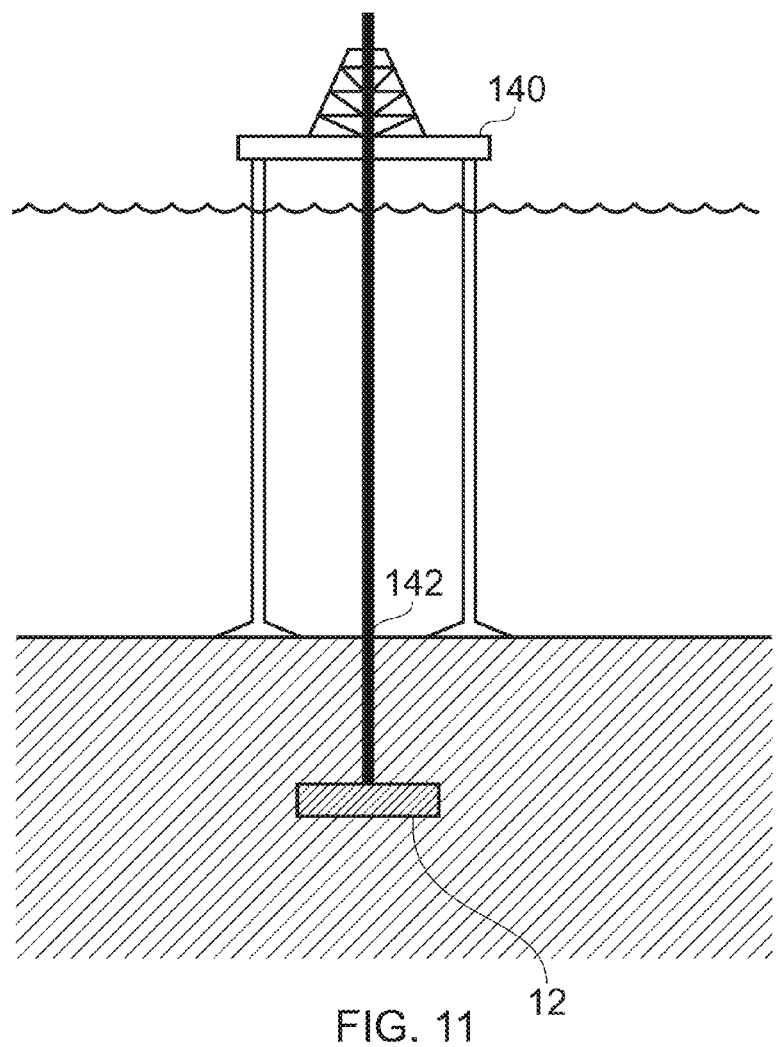
FIG. 11 is a schematic view of an oil rig producing hydrocarbon according to an embodiment of the invention.

FIG. 11 is a schematic view of an oil rig 140 producing hydrocarbon according to an embodiment of the invention (not to scale). The oil rig is located in the vicinity of a region for which geophysical survey data has been obtained and then analyzed according to an embodiment of the invention. Here the analysis of the geophysical data has identified a subterranean hydrocarbon reservoir 12. The identified hydrocarbon reservoir has been penetrated by a hydrocarbon-producing well 142 carried by the oil rig 140. Hydrocarbon (e.g. oil) may be produced from the well 142 (i.e. extracted/recovered from the reservoir 12) using conventional techniques.

Figure 12:
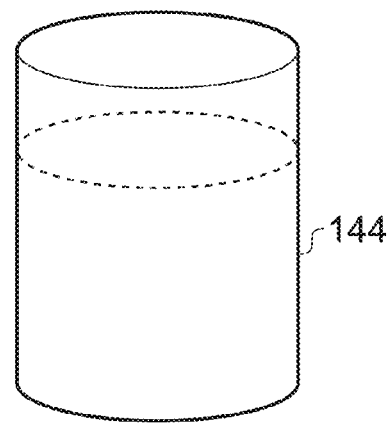
FIG. 12 is a schematic perspective view of a barrel containing a volume of hydrocarbon according to an embodiment of the invention.

FIG. 12 is a schematic perspective view of a barrel containing a volume of hydrocarbon 144 according to an embodiment of the invention. The hydrocarbon is produced using the well 142 shown in FIG. 11.

Embodiments of the invention may include incorporating the methods and associated computer programs described herein as a component in a general geophysical data processing application.

Embodiments of the invention may comprise a computer program product bearing machine readable instructions for carrying out a method in accordance with the above-described embodiments of the invention. Examples of a computer program product bearing machine readable instructions for carrying out the method described above are the mass storage device HDD 30 of FIG. 1, the ROM 26 of FIG. 1, the RAM 28 of FIG. 1 and the system memory 46 of FIG. 2. Other forms of computer program product include a spinning disk based storage device such as a CD or DVD, or a USB flash memory device.

Embodiments of the invention may comprise a computer loaded with and operable to execute machine readable instructions for carrying out a method in accordance with the above-described embodiments of the invention. Examples of a computer loaded with and operable to execute machine readable instructions for carrying out the method described above are the computer of FIGS. 1 and 2.

While certain embodiments have been described, these embodiments have been presented by way of example only, and are not intended to limit the scope of the inventions. It will be appreciated that features and aspects of the invention described above in relation to certain embodiments of the invention are equally applicable and may be combined with other features and aspects of other embodiments of the invention as appropriate. The novel methods, computers and computer program products and devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Thus there has been described a computer-implemented method for processing a seismic trace of a subterranean region comprising: (a) deriving a seismic wavelet for a window of the seismic trace; (b) generating a model for the subterranean region corresponding to that time window comprising a plurality of seismic reflectors by comparing the seismic wavelet with the seismic trace to identify locations for the seismic reflectors, wherein the locations of the seismic reflectors are subject to a separation constraint requiring neighboring seismic reflectors to be separated by at least a minimum separation threshold which is greater than a separation corresponding to a sampling interval for the seismic trace; (c) defining a model seismic wavelet having a model seismic wavelet amplitude spectrum with a frequency bandwidth which is greater than that of the seismic wavelet amplitude spectrum determined for the time-window of the seismic trace; and (d) generating a model of the time-window of the seismic trace for the subterranean region based on the plurality of seismic reflectors of the model for the subterranean region and the model seismic wavelet.

REFERENCES

[1] Kallweit, R. S. and Wood, L. C., 1982, The limits of resolution of zero-phase wavelets: Geophysics, 47, 1035-1047.

[2] Van Riel, P, and Berkhout, A. J., 1985, Resolution in seismic trace inversion by parameter estimation: Geophysics, 50, 1440-1455.

[4 Levy, S. and Fullagar, P. K., 1981, Reconstruction of a sparse spike train from a portion of its spectrum and application to high-resolution deconvolution: Geophysics, 46, no. 09, 1235-1243.

[4] Oldenburg, D. W., T. Scheuer and S. Levy (1983), Recovery of the acoustic impedance from reflection seismograms, Geophysics, Vol. 48, No. 10, 1318-1337.

[5] Daubechies, I., Devore, R., Formasier, M. and Güntürk, C. S., 2010, Iteratively reweighted least squares minimization for sparse recovery: Communications on Pure and Applied Mathematics, 63, 1-38.

[6] Chen, S., S., Donoho, D., L. and Saunders, M., A., 1998, Atomic Decomposition by Basis Pursuit: SIAM J. Sci. Comput. 20, pp. 33-61

[7] Zhang, R. and Castagna, J. P, 2011, Seismic sparse-layer reflectivity inversion using basis pursuit decomposition: Geophysics, 76, 147-158.

[8] Mallet, S. G. and Z. Zhang, 1993, Matching pursuits with time-frequency dictionaries, IEEE Trans. on Sig. Proc., 41, 12, 3397-3415.

[9] Pati, Y. C., Rezaiifar, R. and Krishnaprasad, P., S., 1993, Orthonormal matching pursuit recursive function approximation with applications to wavelet decomposition, Proc. 27th Annual Asilomar Conf. on Signals, Systems and Computers.

[10] Pendrel, J. and van Riel, P., 2000, Effect of well control on constrained sparse spike inversion: CSEG Recorder, Dec. 2000, 18-24.

[11] Wang, Y., 2010, Multichannel matching pursuit for seismic trace decomposition: Geophysics, 75, 61-66.

[12] Aarts, R. M., Larsen, E. and Ouwelltjes, O., 2003, A unified approach to low and high frequency bandwidth extension: Paper 5921, 115th Convention of the Audio Engineering Society.

[13] Larsen, E., and Aarts, R., M., 2004, Audio Bandwidth Extension, Wiley, SBN: 0-470-85864-8.

[14] Dietsz, M., Liljeryd, L., Kjörling, K. and Kunz, O., 2002, Spectral band replication, a novel approach in audio coding: 115th Convention of the Audio Engineering Society, Paper 5553.

[15] Hsu, H., Liu, C. and Lee, W., 2006, Fast Complex Quadrature Mirror Filterbanks for MPEG-4 HE-AAC, 121st Convention of the Audio Engineering Society.

[16] Smith, M., Perry, G., Stein, J., Bertrand, A. and Yu, G., 2008, Extending seismic bandwidth using the continuous wavelet transform: First Break, 26, 97-102.

[17] Devi, K. R. S. and Schwab, H., 2009, High-resolution seismic signals from band-limited data using scaling laws of wavelet transforms: Geophysics, 74, WA143-WA152.

[18] Puryear, C. I. and Castagna, J. P., 2008, Layer-thickness determination and stratigraphic interpretation using spectral inversion: Theory and application: Geophysics, 73, 37-48.

[19] Castagna, J. P., Sun, S. and Siegfried, R. W., 2003, Instantaneous spectral analysis: Detection of low-frequency shadows associated with hydrocarbons, The Leading Edge 22, 120.

[20] Portniaguine, O. and J. P. Castagna, 2004, Inverse spectral decomposition, SEG, Expanded Abstracts, 23, no. 1, 1786-1789.

[21] Chakraborty, A. and Okaya, D., 1995, Frequency-time decomposition of seismic data using wavelet-based methods: Geophysics, 60, 1906-1916.

[22] U.S. Pat. No. 6,985,815

[23] Castagna, J. P. and Sun, S., 2006, Comparison of spectral decomposition methods: First Break, 24, 74-79.

[24] Portniaguine, O. and Casagna, J. P., 2005: Spectral Inversion: Lessons from Modeling and Boonesville Case Study: SEG, Expanded Abstracts, 24, no. 1, 1638-1641

[25] Chopra, S., Castagna, J. P. and Portniaguine, 2006, O., Seismic resolution and thin-bed reflectivity inversion: CSEG Recorder, 31, no. 1, 19-25.

[26] Herrmann, F. J., 2003, Seismic deconvolution by atomic decomposition: A parametric approach with sparseness constraints, Integr. Computer-Aided Eng., 12, 1, 69-90.

[27] Wang, Y., 2007, Seismic time-frequency spectral decomposition by matching pursuit, Geophysics, 72, 13-20.

[28] Broadhead, M. K. and Tonellot, T. L., 2010, Sparse Seismic Deconvolution by Method of Orthogonal Matching Pursuit, 72nd EAGE Conference, p 395.

[29] Zhang, R. and Castagna, J. P, 2011, Seismic sparse-layer reflectivity inversion using basis pursuit decomposition: Geophysics, 76, 147-158.

What is claimed is:

1. A method for obtaining hydrocarbon from an area that contains a hydrocarbon-bearing subterranean reservoir, the method comprising:

processing a seismic trace obtained for the area according to a method comprising:
  (a) deriving a seismic wavelet for a time-window of the seismic trace;
  (b) generating a model for the area corresponding to that time window comprising a plurality of seismic reflectors by comparing the seismic wavelet with the time-window of the seismic trace to identify locations for the seismic reflectors, wherein the locations of the seismic reflectors are subject to a separation constraint requiring at least some neighboring seismic reflectors to be separated by at least a minimum separation threshold which is greater than a separation corresponding to a sampling interval for the seismic trace;
  (c) defining a model seismic wavelet having a model seismic wavelet amplitude spectrum with a frequency bandwidth which is greater than that of a seismic wavelet amplitude spectrum determined for the time-window of the seismic trace;
  (d) generating a model of the time-window of the seismic trace for the area based on the plurality of seismic reflectors of the model for the area corresponding to that time window and the model seismic wavelet;
identifying the presence of the hydrocarbon-bearing subterranean reservoir from the processed seismic traces;
penetrating the identified hydrocarbon-bearing subterranean reservoir with a hydrocarbon-producing well.

2. A volume of hydrocarbon obtained from an area that contains a hydrocarbon-bearing subterranean reservoir, the hydrocarbon obtained by:

processing a seismic trace obtained for the area according to a method comprising:
  (a) deriving a seismic wavelet for a time-window of the seismic trace;
  (b) generating a model for the area corresponding to that time window comprising a plurality of seismic reflectors by comparing the seismic wavelet with the time-window of the seismic trace to identify locations for the seismic reflectors, wherein the locations of the seismic reflectors are subject to a separation constraint requiring at least some neighboring seismic reflectors to be separated by at least a minimum separation threshold which is greater than a separation corresponding to a sampling interval for the seismic trace;
  (c) defining a model seismic wavelet having a model seismic wavelet amplitude spectrum with a frequency bandwidth which is greater than that of a seismic wavelet amplitude spectrum determined for the time-window of the seismic trace;
  (d) generating a model of the time-window of the seismic trace for the area based on the plurality of seismic reflectors of the model for the area corresponding to that time window and the model seismic wavelet;
identifying the presence of the hydrocarbon-bearing subterranean reservoir from the processed seismic trace;
penetrating the identified hydrocarbon-bearing subterranean reservoir with a hydrocarbon-producing well; and
extracting hydrocarbon from the hydrocarbon-bearing subterranean reservoir using the hydrocarbon-producing well.

* * * * *